(12) United States Patent
    Juhasz et al.

(10) Patent No.: US 11,930,871 B2
(45) Date of Patent: Mar. 19, 2024

(54) INTERACTIVE SKIN FOR WEARABLE

(71) Applicant: Interactive Skin, Inc., Houston, TX (US)

(72) Inventors: Paul R. Juhasz, Houston, TX (US); Emily Tiernan, Houston, TX (US)

(73) Assignee: INTERACTIVE SKIN, INC., Houston, TX (US)

( * ) Notice: Subject to any disclaimer, the term of this patent is extended or adjusted under 35 U.S.C. 154(b) by 0 days.

(21) Appl. No.: 17/888,188

(22) Filed: Aug. 15, 2022

(65) Prior Publication Data

US 2022/0386722 A1 Dec. 8, 2022

Related U.S. Application Data

(63) Continuation of application No. 17/505,346, filed on Oct. 19, 2021, now Pat. No. 11,432,604, which is a
(Continued)

(51) Int. Cl.
*G06F 3/044* (2006.01)
*A41B 1/08* (2006.01)
(Continued)

(52) U.S. Cl.
CPC .............. *A41D 27/085* (2013.01); *A41B 1/08* (2013.01); *A41D 1/06* (2013.01); *A41D 3/02* (2013.01); *A43B 3/34* (2022.01); *A43B 3/36* (2022.01); *A43B 3/50* (2022.01); *A43B 23/022* (2013.01); *A45C 3/001* (2013.01); *A45C 3/06* (2013.01);
(Continued)

(58) Field of Classification Search
CPC .......... A41D 27/085; A41D 1/06; A41D 3/02; A41D 1/002; A41D 1/02; A41D 1/04; A41D 1/22; A41B 1/08; A43B 3/34; A43B 3/36; A43B 3/50; A43B 23/022; A45C 3/001; A45C 3/06; A45C 11/00; A45C 2011/002; B60Q 1/0023; B60Q 1/0088; B60R 13/02; B60R 16/02; B60R 99/00; G06F 3/0443; G06F 3/0488; G06F 3/04883; G06F 2203/04102; G06F 3/0446; A44C 15/0015; A44C 15/005; A44C 25/001
See application file for complete search history.

(56) References Cited

U.S. PATENT DOCUMENTS 5,889,671 A * 3/1999 Autermann .......... A01B 79/005
                                                     700/83
8,388,243 B1 * 3/2013 Smith ................. G03B 17/566
                                                     455/575.8
(Continued)

*Primary Examiner* — Antonio Xavier
(74) *Attorney, Agent, or Firm* — The Juhasz Law Firm

(57) ABSTRACT

A wearable may be provided with or configured to provide interactive skin. The interactive skin may be configured for accepting touch input from a user. The interactive skin may include one or more flexible layers and may include or be mounted under a transparent display cover layer such as a layer of clear glass or plastic. Interactive skin may include a touch-sensitive layer that allows a user to provide touch input to the wearable. Display pixels on interactive skin may be used to display visual information to the user. The interactive skin may be configured for detecting a condition of at least one wearable and generating an output function in response to the detected condition.

20 Claims, 22 Drawing Sheets

Related U.S. Application Data continuation of application No. 15/955,487, filed on Apr. 17, 2018, now Pat. No. 11,166,503.

(60) Provisional application No. 62/492,759, filed on May 1, 2017, provisional application No. 62/489,330, filed on Apr. 24, 2017, provisional application No. 62/486,331, filed on Apr. 17, 2017.

(51) Int. Cl.

| | | |
|---|---|---|
| *A41D 1/06* | (2006.01) | |
| *A41D 3/02* | (2006.01) | |
| *A41D 27/08* | (2006.01) | |
| *A43B 3/34* | (2022.01) | |
| *A43B 3/36* | (2022.01) | |
| *A43B 3/50* | (2022.01) | |
| *A43B 23/02* | (2006.01) | |
| *A45C 3/00* | (2006.01) | |
| *A45C 3/06* | (2006.01) | |
| *A45C 11/00* | (2006.01) | |
| *B60Q 1/00* | (2006.01) | |
| *B60R 13/02* | (2006.01) | |
| *B60R 16/02* | (2006.01) | |
| *G06F 3/0488* | (2022.01) | |
| *A41D 1/00* | (2018.01) | |
| *A41D 1/02* | (2006.01) | |
| *A41D 1/04* | (2006.01) | |
| *A41D 1/22* | (2018.01) | |
| *A44C 15/00* | (2006.01) | |
| *A44C 25/00* | (2006.01) | |
| *B60R 99/00* | (2009.01) | |
| *G06F 3/04883* | (2022.01) | |

(52) U.S. Cl.
CPC ............ *A45C 11/00* (2013.01); *B60Q 1/0023* (2013.01); *B60Q 1/0088* (2013.01); *B60R 13/02* (2013.01); *B60R 16/02* (2013.01); *G06F 3/0443* (2019.05); *G06F 3/0488* (2013.01); *A41D 1/002* (2013.01); *A41D 1/02* (2013.01); *A41D 1/04* (2013.01); *A41D 1/22* (2013.01); *A44C 15/0015* (2013.01); *A44C 15/005* (2013.01); *A44C 25/001* (2013.01); *A45C 2011/002* (2013.01); *B60R 99/00* (2013.01); *G06F 3/04883* (2013.01); *G06F 2203/04102* (2013.01)

(56) References Cited

U.S. PATENT DOCUMENTS

| | | | |
|---|---|---|---|
| 2010/0078343 A1* | 4/2010 | Hoellwarth | B29C 45/14639 206/320 |
| 2011/0188176 A1* | 8/2011 | Kim | H04M 1/23 361/679.01 |
| 2012/0194448 A1* | 8/2012 | Rothkopf | G06F 1/1643 361/679.01 |
| 2013/0019207 A1* | 1/2013 | Rothkopf | G06F 3/0489 715/810 |
| 2013/0076649 A1* | 3/2013 | Myers | G06F 3/0488 361/679.01 |
| 2013/0109371 A1* | 5/2013 | Brogan | G06F 1/1639 361/679.09 |
| 2014/0052884 A1* | 2/2014 | Rogers | G06F 1/1632 710/303 |
| 2014/0191034 A1* | 7/2014 | Glanzer | G06K 7/089 235/449 |
| 2014/0282059 A1* | 9/2014 | Oh | G06F 3/0481 715/761 |

* cited by examiner

INTERACTIVE SKIN FOR WEARABLE

BACKGROUND OF THE INVENTION

1. Claim to Priority

This application is a continuation of and claims priority to U.S. Non-prov. Appl. 17/505,346, filed Oct. 19, 2021, now U.S. Pat. No. 11,432,604, which is hereby incorporated by reference in its entirety; U.S. Non-prov. Appl. 17/505,346 claims priority to U.S. Non-prov. Appl. 15/955,487, filed Apr. 17, 2018, now U.S. patent Ser. No. 11/166,503, which is hereby incorporated by reference in its entirety; U.S. Non-prov. Appl. 15/955,487 claims priority to three provisional applications: provisional Application Ser. No. 62/486,331 filed Apr. 17, 2017; provisional Application Ser. No. 62/489,330 filed Apr. 24, 2017; and provisional Application Ser. No. 62/492,759 filed May 1, 2017; all three provisional applications are hereby incorporated by reference in their entirety.

2. Field of the Invention

The present invention relates generally to wearables, and more particularly, to wearables with interactive skin.

3. Description of the Related Art

A wearable is an item that may be worn or carried by a user. A wearable may include clothing, footwear, handbags and accessories.

Clothing is a garment worn on a body. The garment may be men, women and children's clothing, a shirt, pants, dress, coat, jacket, parkas, uniforms, robes, costumes, swim suit, or other worn garments. The clothing may be basics, such as underwear, or luxury items, for example, cashmere sweaters. Clothing may made up of textiles, animal skin, or other material including plastic, synthetic materials like plastic, thin sheets of materials put together, or other materials.

Footwear are items worn on the feet such as shoes, boots, and moccasins. Footwear may be made up of textiles, animal skin, or other material including plastic, synthetic materials like plastic, thin sheets of materials put together, or other materials.

Handbags are purses and bags used for carrying personal items such as personal articles, money, and electronic devices. Handbags may be in the form factor of a handbag, attaché cases, Handbags may be made up of textiles, animal skin, or other material including plastic, synthetic materials like plastic, thin sheets of materials put together, or other materials.

Accessories may be items that are carried or worn with clothing, footwear, or handbags. Traditionally carried accessories include umbrellas, cosmetic bags, luggage, eyewear, hand fans, parasols and umbrellas, wallets, canes, ceremonial swords and dog leashes. Accessories that may be worn include cravats, ties, hats bonnets, belts and suspenders, gloves, mittens, muffs, jewelry,
watches, sashes, shawls, scarves, lanyards, socks, and stockings jewelry, watches, dog collars.

The wearables may be made of different types of materials, and each one is chosen for a different purpose. Important design criteria for wearables may include location on the wearer, function, appearance, fashion, lightweight, price, and environmentally friendly.

User demand for more luxurious and modern interiors and exteriors may also influence the wearables design.

There is a need for improved wearables.

SUMMARY OF THE INVENTION

A wearable may be provided with or configured to provide an interactive skin. The interactive skin may be configured for accepting touch input from a user. The interactive skin may illustratively include one or more flexible layers and may include or be mounted under a transparent display cover layer such as a layer of clear glass or plastic. The interactive skin may include a touch-sensitive layer that allows a user to provide touch input to the wearable. Display pixels on interactive skin may be used to display visual information to the user.

The interactive skin may be configured for detecting a condition of at least one wearable and generating an output function in response to the detected condition. The condition may be detected by a sensor. The interactive skin may be configured with display pixels used to display visual information to the user on the detected condition. The interactive skin may be configured with a touch-sensitive layer that allows a user to provide touch input to the interactive skin to cause the interactive skin to check on the condition of one or more wearables or of a condition of a body of the user or to respond to visual information provided to the user on the detected condition.

The interactive skin may be used to support infotainment, safety, communication connectivity within and without the wearable, and so on. The interactive skin may be used for displaying information and visual feedback to a user and for accepting input from a user.

Active portions of the interactive skin may be used to create virtual user interface controls such as buttons. During use, the buttons or other user input interface elements may be reconfigured. For instance, the user input interface elements may be repurposed for supporting user input operations in different operating modes of the interactive skin. Virtual buttons may be provided. They may be provided additional to or in place of tactile input/output components such as physical buttons and switches.

In operation, a virtual button may be a virtual volume button. The virtual button may control audio output volume. The virtual button may be repurposed based on user input. For example, the virtual button may be repurposed to become a virtual camera shutter button for taking a picture. As another example, the virtual button may be reconfigured to serve as a controller for another device function. Images displayed on the interactive skin may indicate to a user which function is currently being performed by the virtual button. Predetermined inputs to the touch-sensitive layer such as tapping, sliding, swiping, or other motions of an external object such as a finger across the interactive skin may be used to change the operating mode of the interactive skin.

BRIEF DESCRIPTION OF THE DRAWINGS

FIGS. 2A, 2B, 2C collectively referred to herein as FIG. 2.

FIGS. 4A and 4B, collectively referred to herein as FIG. 4.

FIGS. 5A and 5B, collectively referred to herein as FIG. 5.

FIGS. 6A and 6B, collectively referred to herein as FIG. 6.

FIGS. 8A, 8B, 8C, 8D, 8E, and 8F collectively referred to herein as FIG. 8.

FIGS. 9A, 9B, 9C, 9D, 9E, and 9F collectively referred to herein as FIG. 9.

FIGS. 10A and 10B collectively referred to herein as FIG. 10.

FIGS. 11A and 11b collectively referred to herein as FIG. 11.

FIG. 12E shows aspects of an illustrative handbag for carrying an electronic component in this example illustratively a casing for an iPad and a casing for a computing device, the casing configured as or with an interactive skin in accordance with an embodiment of the present disclosure. FIG. 12F depicts an exemplary electronic device. FIGS. 12A, 12B, 12C, 12D, 12E and 12F are collectively referred to herein as FIG. 12.

DETAILED DESCRIPTION OF THE INVENTION

Figure 1:
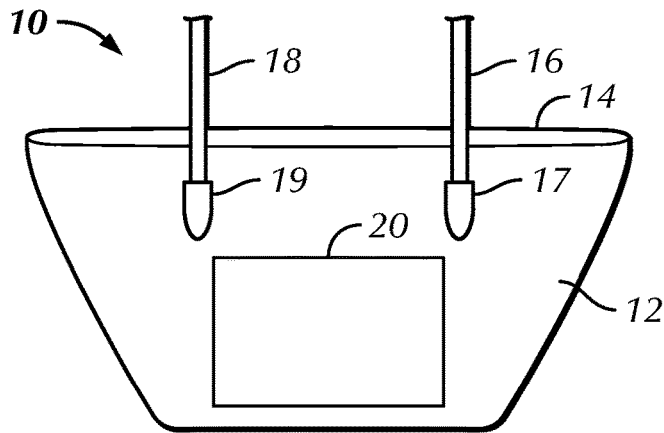
FIG. 1 shows aspects of an illustrative wearable configured as or with an interactive skin in accordance with an embodiment of the present disclosure.

In the following detailed description, reference is made to the accompanying drawings that form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

As used herein, a wearable is an item that may be worn or carried by a user. A wearable may include clothing, footwear, handbags and accessories.

Clothing is a garment worn on a body. The garment may be a shirt, pants, dress, coat, jacket, or other worn garment, Clothing may made up of textiles, animal skin, or other material including plastic, synthetic materials like plastic, thin sheets of materials put together, or other materials. Illustrative clothing include men, women and children's clothing, a shirt, pants, dress, coat, jacket, parkas, uniforms, robes, costumes, swim suit, or other worn garments.

Footwear are items worn on the feet such as shoes and boots. Footwear may be made up of textiles, animal skin, or other material including plastic, synthetic materials like plastic, thin sheets of materials put together, or other materials. Illustrative footwear may include Adidas Kampung, Ballet shoe, Pointe shoe, Bast shoe, Blucher shoe, Boat shoe, Brogan (shoes), Brogue shoe, Brothel creeper, Bucks, Calceology, Cantabrian albarcas, Chopine, Climbing shoe, Clog, Court shoe, Cross country running shoe, Derby shoe, Diabetic shoe, Dori shoes Dress shoe, Driving moccasins, Earth shoe, Elevator shoes, Espadrille, Fashion boot, Galesh, Giveh, heels, pumps, platform shoes, High-heeled footwear traditional galesh, high-heeled shoes with a stiletto heel, jelly shoes, moccasin, soft-soled moccasin, side gusset slip on shoes, Huarache (shoe), Jazz shoe, Jumpsoles, Jutti, Kitten heel, Kolhapuri Chappal, Kung fu shoe, Loafers, Lotus shoes, Mary Jane (shoe), Mojari, Moccasin, Monk shoe, Mule (shoe), Opanak, Opinga, Organ shoes, Orthopaedic footwear, Over-the-knee boot, Oxford shoe, Pampootie, Peranakan beaded slippers, Peshawari chappal, Platform shoe, Pointed shoe, Pointinini, Rocker bottom shoe, Ruby slippers, Russian boot, Saddle shoe, Sandal, Silver Shoes, Slip-on shoe, Slipper, Sneakers (footwear), Snow boot, Spectator shoe, Steel-toe boot, T-bar sandal, Tiger-head shoes, Toe shoe, Tsarouhi, Turnshoe, Venetian-style shoe, Winklepicker, Worishofer, clogs, or any other type of footwear.

Handbags are purses and bags used for carrying personal items such as personal articles, money, electronic devices, etc. Handbags may be made up of textiles, animal skin, or other material including plastic, synthetic materials like plastic, thin sheets of materials put together, or other materials. Illustrative women's handbags may include shoulder bag, satchel, sling bag, quilted bag, clutch, minaudiere, hobo bag, wristlet, beach bag, shopper, bucket, messenger, wallet or purse. Handbags may include tote bag, duffle bag, messenger bag, backpack, doctor's bag, trial bag, laptop bag, bucket bag, bowler bag, pouch, saddle bag, shopping/grocery bag, drawstring bag, make-up bag, foldover bag, phone bag, camera case bag, baguette bags, barrel bag, basket bag, attache case, luggage, Kelly bag. Handbags may include wheeled duffel bag, wheeled luggage, wheeled backpack, travel pack, day pack, briefcase, travel tote, designer luggage, messenger bag, ravel laptop case, suitcase, garment bag, carpet bag, rolling suitcase.

Illustrative electronic devices that may be carried by a handbag include mobile electronic devices, mobile internet devices, tablets, smartphones, cellphones, laptops, personal digital assistants, enterprise digital assistants, calculators, handheld game consoles, portable game consoles, portable media players, ultra-mobile PCs, digital media player, digital still cameras (DSC), digital video cameras (DVC) or digital camcorders, phones, pagers, personal navigation devices (PND), projectors, portable display devices, monitors.

Accessories may be items that are carried or worn with clothing, footwear, or handbags. Traditionally carried accessories include eyewear, hand fans, parasols and umbrellas, wallets, canes, and ceremonial swords. Accessories that may be worn include cravats, ties, hats, bonnets, belts and suspenders, gloves, muffs, jewelry, key chains, name plates, lighters, watches, sashes, shawls, scarves, lanyards, socks, and stockings.

A wearable may be provided with or configured to provide an interactive skin. The interactive skin may be configured for accepting touch input from a user. The interactive skin may illustratively include one or more flexible layers and may include or be mounted under a transparent display cover layer such as a layer of clear glass or plastic. The transparent layer may be configured to hermetically seal, environmentally protect, and so on, the flexible layers lying under the transparent layer. The interactive skin may include a touch-sensitive layer that allows a user to provide touch input to the wearable. Display pixels on interactive skin may be used to display visual information to the user.

Interactive skins may be configured for detecting a condition of at least one wearable and generating an output function in response to the detected condition. The condition may be detected by a sensor. Interactive skins may be configured with display pixels used to display visual information to the user on the detected condition. Interactive skins may be configured with a touch-sensitive layer that allows a user to provide touch input to the interactive skin to cause the interactive skin to check on the condition of one or more wearables or of a condition of a wearable or to respond to visual information provided to the user on the detected condition.

The interactive skin may be used to support infotainment, safety, communication connectivity within and without the wearable, and so on. The interactive skin may be used for displaying information and visual feedback to a user and for accepting input from a user.

Active portions of the interactive skin may be used to create virtual user interface controls such as buttons. During use, the buttons or other user input interface elements may be reconfigured. For instance, the user input interface elements may be repurposed for supporting user input operations in different operating modes of the interactive skin. Virtual buttons may be provided. They may be provided additional to or in place of tactile input/output components such as physical buttons and switches.

In operation, a virtual button may be a virtual volume button. The virtual button may control audio output volume. The virtual button may be repurposed based on user input. For example, the virtual button may be repurposed to become a virtual camera shutter button for taking a picture. As another example, the virtual button may be reconfigured to serve as a controller for another device function. Images displayed on the interactive skin may indicate to a user which function is currently being performed by the virtual button. Predetermined inputs to the touch-sensitive layer such as tapping, sliding, swiping, or other motions of an external object such as a finger across the interactive skin may be used to change the operating mode of the interactive skin.

FIG. 1 depicts an illustrative wearable 10 that may be provided with an interactive skin 20 of this disclosure. Wearable 10 may illustratively be a tote bag or other large bag for carrying items. Alternatively, wearable 10 may be a purse or any other bag used for carrying personal items such as personal articles, money, and electronic devices. See definition of wearable above for other illustrative wearables for use with this disclosure.

Wearable 10 may include a front panel 12, a back panel 14, and a pair of handles or straps, one with portions 16, 18 having terminating ends 17, 19 that may be attached to the front panel of the handbag. The other pair of straps is not shown.

Figure 2A:
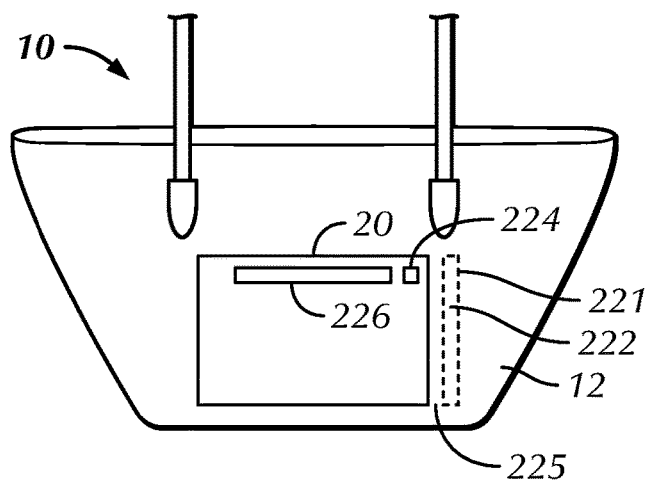
FIGS. 2A, 2B, 2C depict some illustrative handbags with which an interactive skin of this disclosure may be used.

FIG. 2 shows front panel 12 of a wearable in the form factor of handbag 10 shown in FIG. 1A adapted with the interactive skin 20 in two illustrative configurations. In FIG. 2A, interactive skin 20 is depicted as in FIG. 1A. As shown in FIG. 2A, interactive skin 20 may overlay or be received within or form an integrated part of a portion of the front panel 12 of the wearable in the form factor of handbag 10.

Figure 2B:
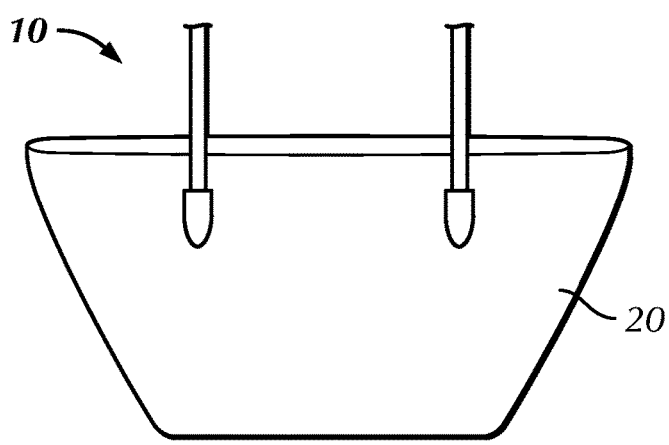

In an alternative illustrative embodiment depicted in FIG. 2B, interactive skin 20 may overlay or be received within or form an integrated part of substantially all or all of the front panel of the wearable in the form factor of handbag 10. In either or other embodiments, illustratively, interactive skin 20 may be bent to contour the panel of the wearable. Alternatively, interactive skin 20 may be configured to provide the panel of the wearable with a predetermined contour.

Figure 2C:
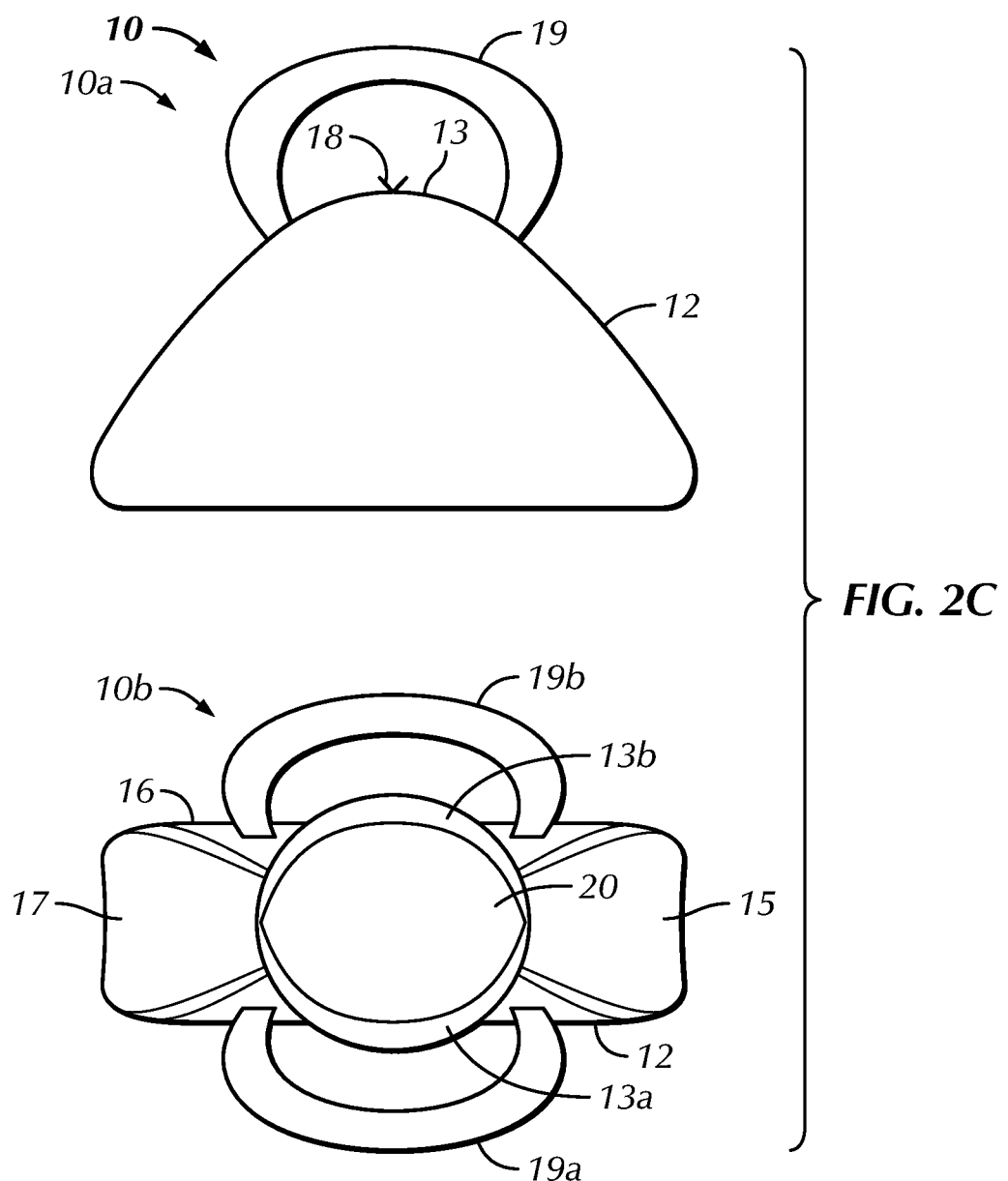

In FIGS. 2A and 2B, interactive skin 20 may overlay or be received within or form an integrated part of substantially all or all of an outside portion of the wearable in the form factor of handbag 10. FIG. 2C depicts interactive skin 20 may overlay or be received within or form an integrated part of substantially all or all of wearable in the form factor of handbag 10. Wearable in the form factor of handbag 10 is depicted in FIG. 2C both in a closed position 10a and an open position 10b. Best seen in the closed position 10a in FIG. 2C, wearable in the form factor of handbag 10 includes a side panel 12 including an upper edge 13, a handle 19, and a clasp 18. Best seen in the open position 10b in FIG. 2C, wearable in the form factor of handbag 10 includes an interactive skin 20 that extends along an inside portion of the wearable in the form factor of handbag 10. Alternatively, interactive skin 20 may overlay or be received within or form an integrated part of substantially all or all of any inside portion of the wearable in the form factor of handbag 10. As the open position 10b in FIG. 2C also shows, wearable in the form factor of handbag 10 further includes a side portion 16 opposite side portion 12, and front portion 15 and back portion 17. Handle 19 depicted in the closed position 10a is seen in the open position of the wearable to include a pair of handles 19a and 19b, one attached to each of side portion 12 and side portion 16. In the closed position 10b, these handles are brought together and illustratively grasped by a user for carrying.

In an illustrative embodiment of FIG. 2C, the entire wearable in the form factor of handbag 10 may be constructed from an interactive skin. For instance, an interactive skin depicted in FIG. 2C may be configured to provide the side portion 16, the opposite side portion 12, and the front portion 15 and the back portion 16. Interactive skin may also be provided on the pair of handles 19a and 19b. In such case where the loading created by grasping the handles comes into play, the loading may be distributed about the interactive skin down to the panels through the use of ribbings, for example, as explained later in this disclosure.

Figure 3:
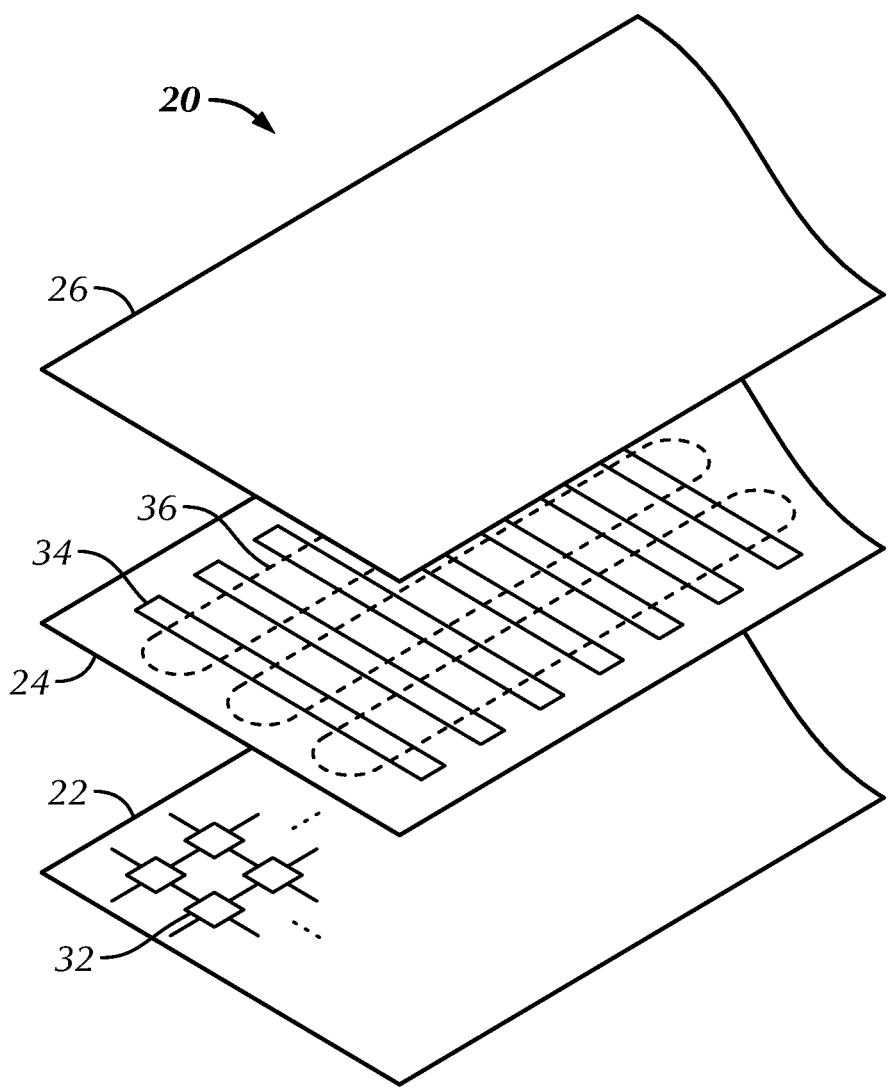
FIG. 3 depicts an illustrative interactive skin in accordance with an embodiment of this disclosure.

As shown in FIG. 3, interactive skin 20 may be formed from multiple layers of material. The interactive skin 20 may be formed by stacking multiple layers.

In the illustrative embodiment, the interactive skin may include a flexible display layer 22, a touch sensitive layer 24, and a transparent display cover layer 26. The flexible display layer 22 may include a display pixel array 22 which may, for example, be an organic light-emitting diode (OLED) array. Other types of interactive skin pixel arrays may also be formed. For example, the image pixels may be formed from light-emitting diodes, plasma cells, electronic ink elements, liquid crystal display components, or other suitable image pixel structures compatible with the interactive skin. The flexible display layer may illustratively be formed using flexible sheets of polymer or other substrates having thicknesses of 10 microns to 0.5 mm or other suitable thicknesses.

The touch sensitive layer 24 may be a layer on which a pattern of indium tin oxide (ITO) electrodes or other suitable transparent electrodes have been deposited to form a capacitive touch sensor array. As depicted in FIG. 3, touch sensitive layer 24 may incorporate capacitive touch electrodes such as horizontal transparent electrodes 34 and vertical transparent electrodes 36. Touch sensitive layer may be configured to detect the location of one or more touches or near touches on touch sensitive later 24. Detection may be based on capacitive, resistive, optical, acoustic, inductive, or mechanical measurements, or any basis that can be measured with respect to the occurrence of one or more touches or near touches in proximity to the touch sensitive layer 24. The touch sensitive layer may illustratively be formed using flexible sheets of polymer or other substrates having thicknesses of 10 microns to 0.5 mm or other suitable thicknesses.

Software and/or hardware may be used to process the measurements to the detected touches to identify and track the one or more touches or near touches. A gesture may occur by moving one or more fingers or other objects in a particular manner on touch sensitive layer 24. Examples of gestures include tapping, pressing, and rocking. It may also include scrubbing, twisting, and changing orientation. It may include pressing with varying pressure and the like at essentially the same time, contiguously, or consecutively. A gesture may illustratively be characterized by a pinching, sliding, swiping, rotating, flexing, dragging, or tapping motion between or with any other finger or fingers. A single gesture may be performed in a variety of ways. For instance, with one or more hands, by one or more users, or any combination thereof.

In addition to flexible display layer 22 and touch sensitive layer 24, interactive skin 20 may include one or more structural layers. For example, interactive skin 20 may include the transparent display cover layer 26. In other words, flexible display layer 22 and touch sensitive layer 24 may be covered with a flexible or rigid cover layer. The transparent display cover layer 26 may be formed from a glass or plastic and may be flexible but alternatively may be rigid. The transparent layer may be configured to hermetically seal, environmentally protect, and so on, the flexible layers lying under the transparent layer.

In addition, flexible display layer 22 and touch sensitive layer 24 may include one or more structural layers. Flexible display layer 22 and touch sensitive layer 24 may be mounted on a support structure. For example they may be mounted on a rigid support. Layers of adhesive may be used in attaching interactive skin layers to each other and may be used in mounting interactive skin layers to rigid and flexible structural layers. The structural layer may be a wearable to which the interactive skin is attached.

Alternatively, interactive skin may be integrated with a material configured to provide more structure to the interactive skin. For instance, the interactive skin may be integrated into injection-molded plastics. In this embodiment, the integrated structure may provide both interactive skin and support structure.

Where the cover layer for interactive skin 20 is flexible, input-output components that rely on the presence of flexible layers may be mounted at any suitable location under the interactive skin. For example, they may be mounted along peripheral portions of the interactive skin, in a central portion of the interactive skin, and so on. For example, a speaker component may be mounted, for example, to the wearable illustratively under, along side of, or in proximity to the interactive skin. In another embodiment, input-output components may be remotely located and associated with the interactive skin.

Where the flexible layers are covered by a rigid cover glass layer or other rigid cover layer, one or more openings may be provided in the rigid layer and electronic components may be mounted for example, to the wearable under the openings of the interactive skin.

Figure 7:
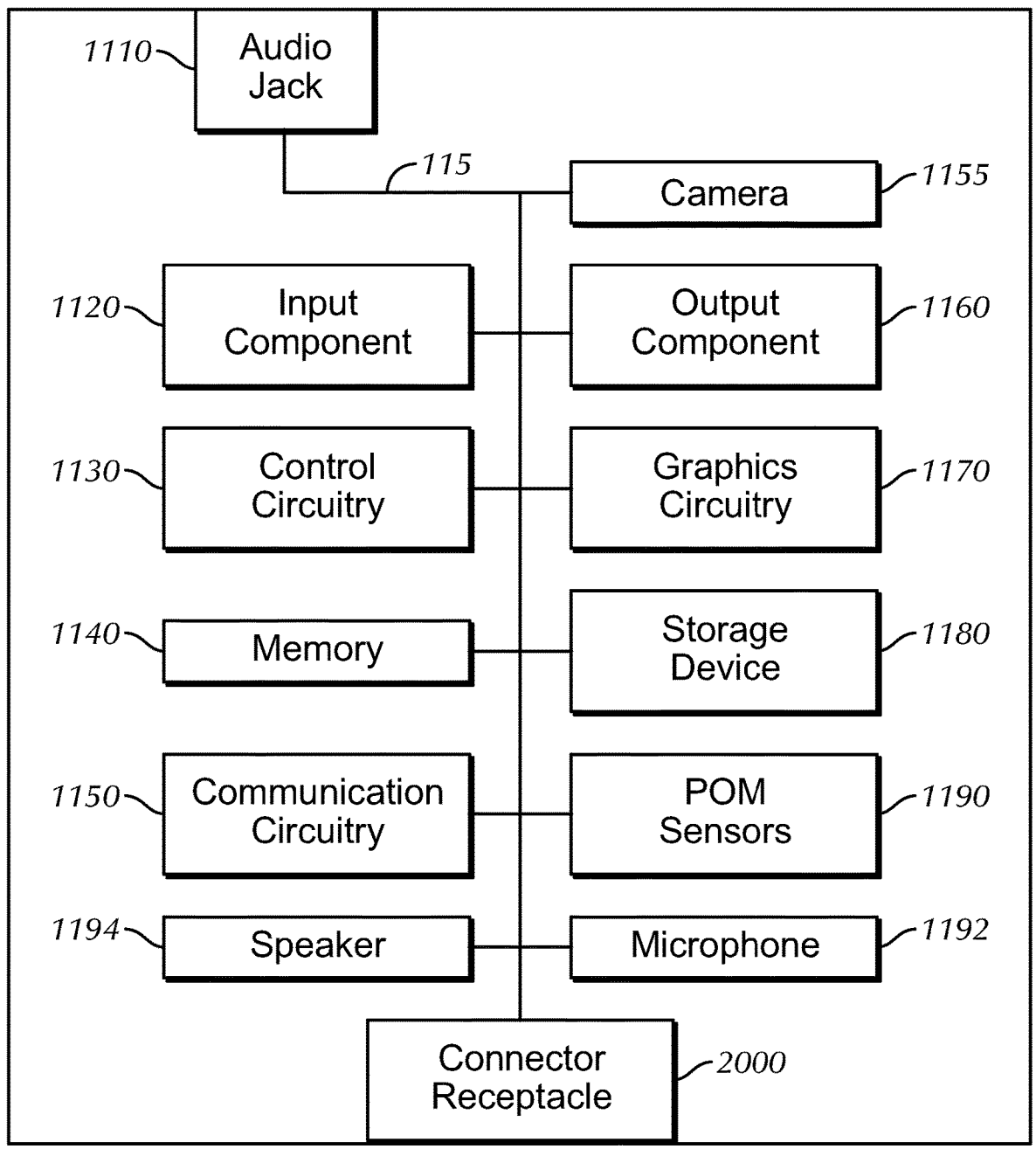
FIG. 7 depicts a block diagram of illustrative electronic components, circuitry, sensors, and connectors for use with the interactive skin of this disclosure.

The openings in interactive skin and/or wearable may accommodate electronic components like volume, ringer, sleep, other buttons; openings for an audio jack, data port connectors, removable media slots; camera; sensors; microphone; speaker; and so on. With or without openings, FIG. 7 depicts illustrative electronic components that may be accommodated by interactive skin and/or wearable. One or more components may be configured in a housing connected to or associated with the wearable. The one or more components may be distributed along or about the wearable such as about the interactive skin. The one or more components may be distributed in an injection-molded plastic incorporating both interactive skin and support structure. The one or more components may be provided by a computing device like a smart phone or remote computing device.

FIG. 2A shows that interactive skin 20 may bend into and run under or inside the wearable. For example, interactive skin 20 is seen to extend along wearable, bend into the wearable, extend under portion 225 of the wearable and a portion of interactive skin 222 may be visible through opening 221 of the wearable.

Illustratively, a portion 222 of interactive skin may be configured to include virtual buttons, virtual switches, scrolling displays, and so on. Alternatively, these features may be provided in other portions of interactive skin, like portion 221. The openings 221 that may be created in the wearable may be round openings, rectilinear openings, oval shaped or oddly shaped openings, and so on.

Display portions of interactive skin 20 may be separated from other portions of interactive skin 20. This may illustratively be done by using a printed or painted mask on an internal surface of the cover layer. Alternatively, portions of the interactive skin may be separated by selectively activating and inactivating display pixels. This may create virtual borders, virtual sections, or other visual delineations between portions of interactive skin 20.

In some embodiments, portions of interactive skin 20 such as peripheral regions may be inactive. Other portions of interactive skin 20 such as a rectangular central portion may correspond to an active part of interactive skin 20. In the active region, an array of image pixels may be used to present text and images to a user of interactive skin 20. In the active region, interactive skin 20 may include touch sensitive components. These components may allow for input and interaction with a user of interactive skin 20. In an alternative embodiment, the active region may include sensors for detecting conditions as explained later in this disclosure.

In another illustrative embodiment, all or substantially all of the interactive skin 20 may be covered with display pixels. Edge portions of interactive skin 20 may contain portions of the array of image pixels for presenting to present text and images to a user of interactive skin 20. The edge portions may also include touch-sensitive components for input and interaction with a user of interactive skin 20.

Figure 4A:
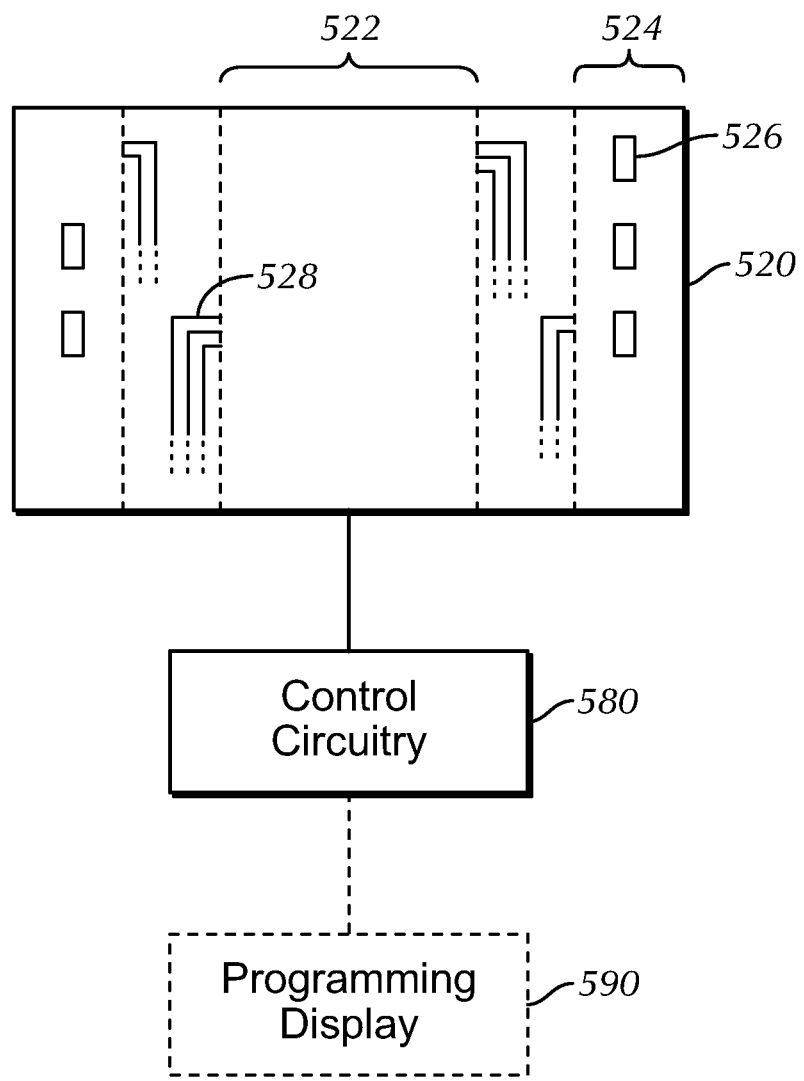
FIG. 4A depicts illustrative control circuitry coupled to an interactive skin in accordance with an embodiment of this disclosure.

FIG. 4A shows how interactive skin 20 may be coupled to control circuitry such as control circuitry 580 associated with the interactive skin 20. The control circuitry may be dedicated to the interactive skin. Alternatively, a plurality of interactive skins according to this disclosure may have a dedicated controller. In another illustrative embodiment, a controller may be provided in a wearable and may be in electrical communication with the interactive skin and may control the functioning of the interactive skin. In another embodiment, the controller may be a smart phone that may be in electrical communication with the interactive skin of this disclosure.

In another embodiment depicted in FIG. 4B, the controller may be a remote computing device such as computing device 437 or server 431 that may recognize and establish electrical communication with communication circuitry associated with an interactive skin of a wearable explained below. For example, computing device 437 in a restaurant, a store, a hotel, an office, a business establishment, a home, a building, or in any location, inside or outside, may establish an electrical communication with the wearable through the communication circuitry associated with the interactive skin.

Alternatively, server 431 may do the same, a communication link in that case may go through an access point 434 and across Internet 433. Communication may go through a base station 435 and over a cellular network if for example server 431 or communication circuitry associated with an interactive skin are configured to communicate in that way. Communication from server 431 may go through computing device 437, which may be a personal computer, a mobile terminal like a smart phone or other computer device. Alternatively, server 431 may communicate with communication circuitry associated with an interactive skin of a wearable through an Ethernet or other network connection. In an illustrative embodiment, computing device 437 may be in a restaurant, an office, a home, or outside location and configured to recognize and establish an electrical communication with all wearables in that location. The computing device may be configured to cause one or more wearables with interactive skin within range to change some configuration. For instance, if the event is a party at a restaurant or office lunch room, the computing device may change the configuration of one or more detected wearables with interactive skin to a color or pattern of colors for a theme for the party. In one illustrative example, if the party is for a 7 year old girl at a restaurant, one or more or all of the wearables of the girls in attendance may be configured by the computing device to display pink so that all the girls show pink.

By "all of the wearables" is meant that a 7 year girl in this example, may wear more than one wearable with interactive skin. For example, she may wear a wearable in the form factor of a shirt with interactive skin of this disclosure, a wearable in the form factor of tennis shoes with interactive skin of this disclosure, a wearable in the form factor of a dress with interactive skin of this disclosure, a wearable in the form factor of a necklace with interactive skin of this disclosure and carry a wearable in the form factor of a handbag with interactive skin of this disclosure. In addition, at the restaurant, she may be given a wearable in the form factor of a nameplate with interactive skin of this disclosure. Computing device 437 may configure any one or more of the wearables of this girl and others in accordance with a color or pattern of colors or display of images, sounding of audibles, statically or dynamically, etc. according to this disclosure.

In another example, a computing device at an outdoor St. Patrick's Day gathering may configure one or all of the wearables detected by the computing device to display green so that all the configured wearables show green. The wearables with interactive skin may be configured with any color, audible sound, image, video, text and in other ways according to this disclosure.

In an illustrative embodiment, a computing device in a store, such as a grocery, department, or supply goods store, may detect a wearable with an interactive skin and communicate with the person associated with that wearable through the interactive skin. For instance, where, for example, the interactive skin is on a sleeve of an article of clothing, the computing device may communicate with the person associated with the person by displaying information on the interactive skin about items that may be of interest to the person.

In another embodiment, information on user buying behavior and preference may be collected and be accessible by a computing device in a store computer. FIG. 4B shows one database stored in a memory 436 associated for example, with computing device 437 or server 431, or both. The memory 436 may be populated with information on the wearable. In the illustrative example, the memory 436 may include information on the user (or purchaser of the wearable or both), the form factor of the wearable, the date of the last visit of the user (or the wearable) to the store, the stores the wearable has been identified at (if the system tracks more than one store), the last purchase done by a person wearing that wearable, the items purchase (including for example, when purchased, price, discount coupons used, sales promotional discounts applicable, where purchased), user demographics, demographic preferences, preferences of the wearer of the wearable, information that the store may want to communicate such as upcoming sales, product discounts, historical purchasing information, historical preferences of a user, and so on, On detection of a wearable skin of a user in the store, the computing device of the store may send the interactive skin information on items on sale, etc. that may be of interest to the user based upon, for example, user preferences or prior shopping patterns of the user.

The computing device or server 431 may also track information from sensors associated with the wearable with interactive skin to track the location of the wearable in the store or another location. In this way the store may be able to collect data on what sections of a store a user of the wearable visits, for how long, and so on. This gathered information may be stored in memory 436 depicted in FIG. 4B and used by the store for marketing, promotional, or other purposes. For instance, a user of a wearable with an interactive skin of this disclosure may spend 30% of her time in a store at the make-up counter which may indicate a particular interest of the user of the wearable in make-up. The store may use this information on interest in make-up in promoting make-up, sales, discounts, etc. to the user. This may occur when the user of the wearable is identified to be on premises. It may also occur when the user is not on premises. For instance the store may text this information to a user of the wearable even if not on site. As another example, the store may post this information through an application downloaded by the user of the wearable.

Figure 4B:
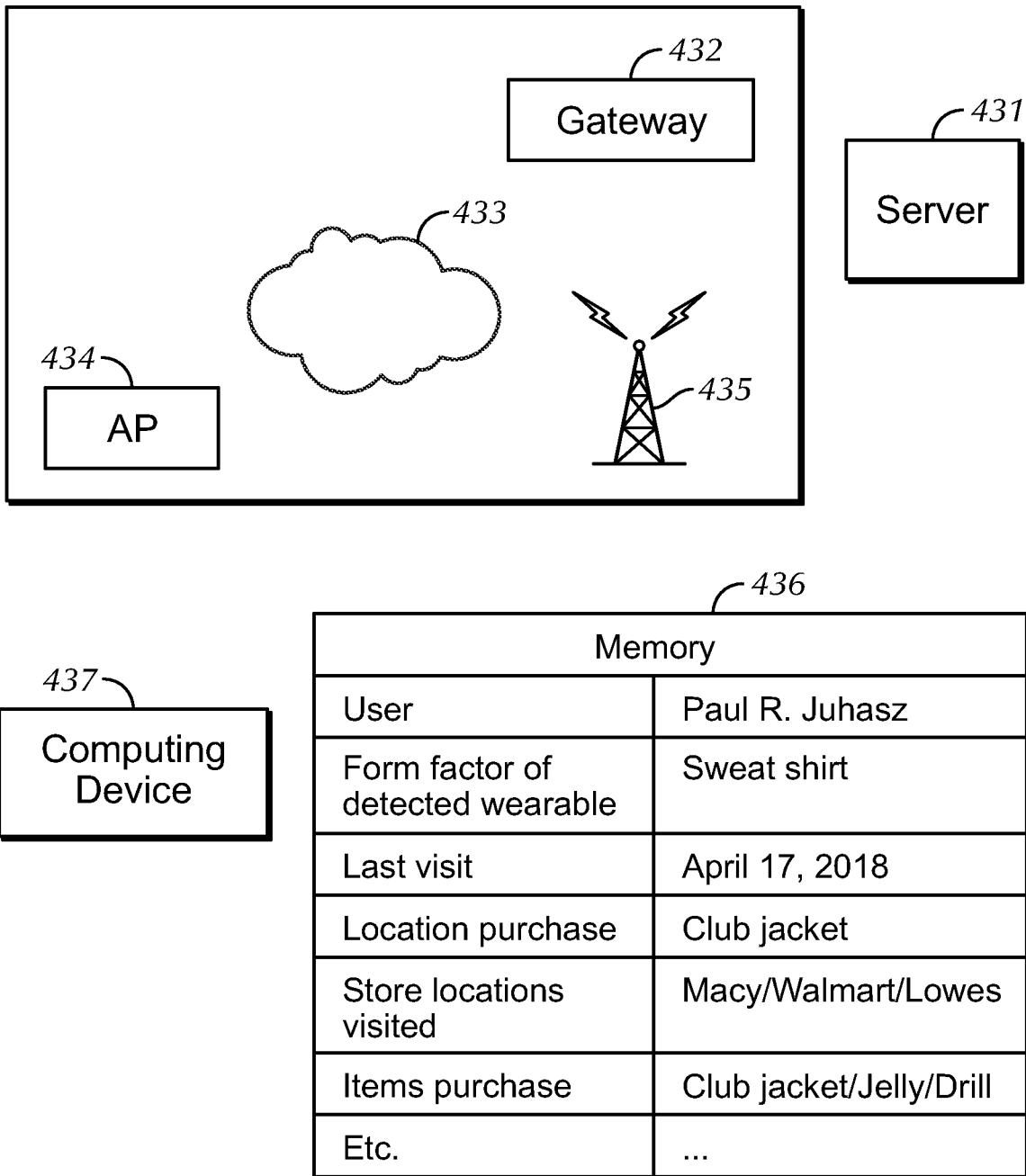
FIG. 4B depicts remote control of an interactive skin according to this disclosure.

In another embodiment, an interactive skin of a wearable communicates wirelessly through the internet to a remote computer on a network as depicted in FIG. 4B. On entering a store in a network, the interactive skin may be wirelessly detected by the network computer through wireless communication by the interactive skin to the network computer (e.g., server 431) over the internet 433 through access point 434 in the store. On detection of a wearable skin of a user in the store, the network computing device may send the interactive skin information on items on sale, etc. that may be of interest to the user based upon, for example, user preferences or prior shopping patterns of the user.

The user of the wearable may also communicate with computing device 437 and server 431. For instance, a user wearing a wearable in the form factor of a coat with interactive skin on an inside sleeve as disclosed in FIGS. 9C-9F, for example, on entering a store may touch a button (like a virtual button as disclosed herein) on the interactive skin to cause the interactive skin to display a window configured to receive information entered by the user and to communicate the entered information to the computing device or server or both. For instance, an application provided by the store and downloaded and executed by control circuitry 580 as explained in this disclosure may be opened up by user touches of the interactive skin and virtual buttons, for instance. Touches of these or other buttons associated with the interactive skin may be used to bring up a window for entering user information. A user may enter the information into the window and send the information to the computing device 437 or server 431 or both. Alternatively, memory associated with the control circuitry 580 may store a cellular phone number of the store which the user may text message using the virtual buttons, for example, on the interactive skin. In this case the communication circuitry associated with the wearable may be configured for cellular communication as explained in this disclosure. In these and other ways, a user of a wearable interacts with a computing device or server at any location to improve the experience there.

The computing device or network computer may collect shopping, buyer, purchase preferences, marketing, and so on information on the user associated with the wearable. Information, such as depicted in memory 436 in FIG. 4B may be gathered by the computing device or server or both on the user of the wearable. The information may be updated with information gathered on visits. The visits may be to a store configured with a computing device 437 depicted in FIG. 4B, a network of stores that may be configured to server 431, or to any location.

Information may be gathered from any location. For example, a computing device at a park, may detect a wearable with interactive skin of this disclosure and gather information on the wearable such as what activity did the user engage in (e.g., jogging, walking, tennis, etc.), what level of intensity was the activity (e.g., force sensors associated with the wearable in the form factor of footwear may register forces generated by the user on the footwear which the wearable may communicate to the computing device at the park), duration of activity, duration of different levels of activity, etc. The computing device at park may communicate this information gathered on the wearable to a remote computing device, such as at a footwear store or a network of computing devices, such as a network of stores selling footwear. The computing device or network computing device or both may create a new record on the wearable if one does not exist or add this information to the record of information the network computing device may already have on the wearable.

In combination, a wearable with interactive skin and a remote or other computing device may form a system for interacting with the wearable with interactive skin of this disclosure. In an illustrative embodiment, the system tracks the activities of a wearable with interactive skin. For example, a wearable in the form factor of a pair of Calvin Klein jeans having an interactive skin may enable the system to detect the form factor of the wearable and communicate information to the interactive skin on the wearable on sales going on in the store on Calvin Klein jeans, jeans or on other wearables that may be associated with Calving Klein or other jeans, such as a sale on Calvin Klein branded or other belts, shirts, and so on. The information may be received through communication circuitry associated with the wearable with interactive skin and displayed on a display on the interactive skin on the wearable, a pair of jeans in this example. For example, an interactive skin may reside along the front side of an upper leg portion of a jean. Receipt of an alert an output associated with the interactive skin may prompt the user to read the information displayed on the interactive skin received from the computing device.

In an illustrative embodiment, the information displayed on the interactive skin may be rendered in way that may be easiest for the user to decipher. For instance, where the wearable in the form factor of pair of jeans with interactive skin may be rendered upside down with respect to the ground so that a user can lean over and read the information on the interactive skin on the pair of jeans more easily. Where the wearable is a shirt or a coat and the interactive skin is along an inside portion of the sleeve, the information displayed, such as lines of textual information, may run along the length of the sleeve or run across the width of the sleeve. In an illustrative embodiment, the lines run across the width of the sleeve and are upside down with respect to the hand so that a user may bend the sleeve toward the user to allow the information to be more easily read.

In one illustrative embodiment, information about the wearable such as the form factor may be stored in a memory associated with the wearable as described in this disclosure. The information about the wearable may include any information including the make, model of the wearable, date of purchase, owner of the wearable, user of the wearable, and so on. Information on the wearable may be entered into and stored in one or more memory associated with the wearable using an interface rendered on the interactive skin or through another display as described in this disclosure.

In one illustrative embodiment, a computing device in a system of computing device and wearable with interactive skin of this disclosure detects a wearable with interactive skin, identifies the purchaser of the wearable, determines the user buying history, user preferences, and so on, and sends information to the wearable skin with interactive skin of this disclosure based on this determination. In this example, the computing device may collect information about the different wearables with interactive skin that may be used by the user, recognize a repeat customer, for example, despite the user wearing different wearable to different stores, for example, on different visits, for example, including at different times of the year. In another example, the system tracks the purchaser of the wearable. Where for example, a mother buys a pair of jeans for her daughter, the instant illustrative tracking system may track the activities of the mother, the daughter or both in one or more stores as well as track other information associated with the wearable such as how many customers come to a store with a wearable in the form factor of a Giorgio Armani® handbag.

In yet another example, the system may track the sections of a store frequented by a user of a wearable with interactive skin of this disclosure to determine sections of interest to the wearer and then send information to the wearable with interactive skin of this disclosure based upon this information. For example, if collected information indicates the user spends a lot of time in the make-up or woman's clothing section of a store, the system may send information to the user through the wearable with interactive skin of this disclosure about those sections, such as sales going on there, which may inform the user and lead to more sales.

Frequency of visited sections, type of wearable being worn, and other information available on the wearable with interactive skin through memory associated therewith may enable a system of wearable with interactive skin of this disclosure and a computing device to improve the experience of a store visit for customer, store, and others. For example, a system may collect, aggregate, and correlate information from a plurality of consumers using wearables with interactive skin to demographics, preferences by demographics, etc. in order to enable the system to communicate information to a wearable with interactive skin based on targeted demographics, age, demographic preferences, age preferences and so on.

For instance, if the user is a girl, the information may be targeted to preferences of girls. In another example, if the user is a teenaged girl, the information may be targeted to teenaged girls. If the user is a senior citizen, the information may be so targeted. Users of different ethnicities may be targeted with information of particular interest to such users—for example, Indian, Mexican, or Hungarian food items. Users of different income brackets may be targeted with information based upon their income. For example, a computing device or server in a system of wearables with interactive skin of this disclosure may send information on a medium priced good wine to a user of a wearable with interactive skin who is for instance in a lower income bracket or who has information in the system concerning a preference for medium priced good wine, income bracket notwithstanding. In another example, a computing device or server in a system of wearables with interactive skin of this disclosure may send information on a high priced excellent wine to a user of a wearable with interactive skin who is for instance in a higher income bracket or who has information in the system concerning a preference for high priced excellent wine, income bracket notwithstanding.

In another illustrative example, the user of the wearable with interactive skin may program the wearable with preferences of the user. For example, if a user prefers Thai food, the wearable may be programmed with that preference. In this illustrative example, on detection of the user with this wearable, the computing device may send to the user through the wearable with interactive skin information about Thai food items in the store.

In an illustrative example, the user of a wearable with interactive skin on the inner sleeve of his shirt and having a preference for Thai food may be driving his car. A computing device in a Thai restaurant in the vicinity of the car may recognize the user wearing a wearable with interactive skin of this disclosure, establish a communication link as described in this disclosure, gather information on the wearable, detect that the user likes Thai food, and send a message to the wearable with interactive skin that the user is near a Thai restaurant.

The communication link may be established, by for example, an application running on computing device associated with the wearable, including a control circuitry 580 as depicted in FIG. 4A and associated memory and communication circuitry. As explained in this disclosure, the computing device may be dedicated to a wearable with interactive skin of this disclosure, may control a distributed plurality of wearables with interactive skin of this disclosure, may be a mobile or other computing device in the vicinity of the wearable with interactive skin of this disclosure or remote from the wearable with interactive skin of this disclosure, such as server, or other computing device. The information from the computing device associated with the Thai restaurant may be communicated to the wearable with interactive skin and displayed on the sleeve of the user of the wearable.

The wearable with interactive skin of this disclosure may be configured to communicate with any computing device. The wearable with interactive skin may communicate with a computing device while in a grocery store, a department store, a supply store, or other store. The wearable with interactive skin may communicate with a computing device while in a house or apartment, an office or building, in a vehicle. The wearable with interactive skin may communicate with a computing device anywhere that the wearable with interactive skin may establish communication with a computing device.

In another illustrative example, the information programmed into memory associated with the wearable may include the smart phone number of the smart phone of the user of the wearable. After receiving information from the wearable with interactive skin in the manner explained in this disclosure, the computing device may communication information to the user by sending information to the smart phone of the user, such as by texting the user.

Figure 14:
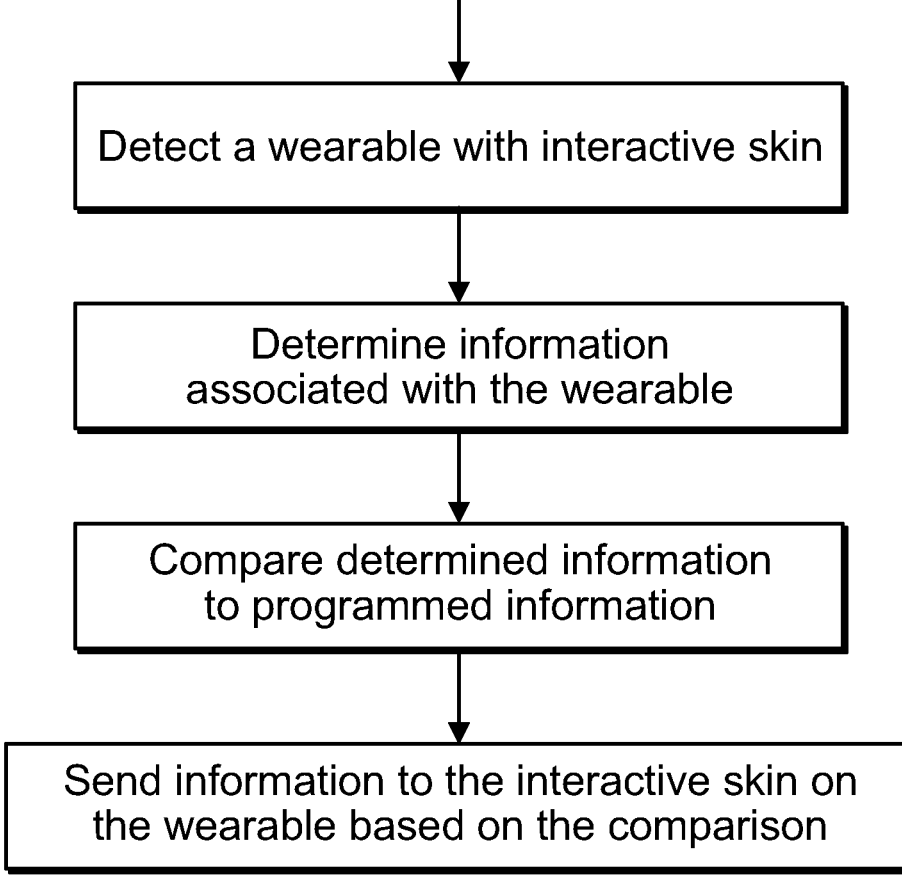
FIG. 14 depicts an illustrative method for configuring a wearable with interactive skin by remote computer

In one illustrative method depicted in FIG. 14, (a) a memory associated with a wearable with interactive skin is programmed with information about the wearable such as the identity of the purchaser and/or user associated with the wearable form factor, the form factor of the wearable; the shopping, buyer, purchaser, user preferences, marketing, etc., the smartphone number of the purchaser and/or user; the make, model of the wearable, date of purchase, owner of the wearable, etc. (b) A wearable with interactive skin is detected such as by a computing device. (c) Information on the wearable is determined such as by a computing device. (d) The determined information is compared to the programmed information such as by a computing device, (e) information is sent to the interactive skin on the wearable based on the comparison. The information on the user in the memory associated with the computing device may include buying history information on the user buying history, user preferences, store visits, demographics, previously stored user preferences, time spent at a particular section of a store, and so on.

In another illustrative embodiment, information on in memory associated with a wearable with an interactive skin may be accessed by authorities for law enforcement, legal, or other purposes. For instance, if a wearable with interactive skin is stolen, a remote computer in communication with the wearable with interactive skin may track the wearable through GPS sensors, location tracking, and other ways to find the wearable with interactive skin and the thief in accordance with the teachings of this disclosure.

Turning back to FIG. 4A, the communication link between controller and the interactive skin may be created by wire, wireless, or by optical communication. In wireless and optical embodiments, the interactive skin may be provided with communication circuitry such as wireless communication hardware and associated software to communicate wirelessly, such as by WiFi, WAN, blue tooth or other wireless communication technology. This in order to allow a controller to control the interactive skin.

Control circuitry 580 may illustratively include memory storage. Examples of storage include flash memory, hard disk drive memory, and solid state storage devices. It also includes other nonvolatile memory, random-access memory and other volatile memory, and so on.

Control circuitry 580 may also include processing circuitry. The processing circuitry of control circuitry 580 may include microprocessors, digital signal processors, microcontrollers, application specific integrated circuits. It may also include power management unit (PMU) circuits, and processing circuitry that is part of other types of integrated circuits.

Control circuitry 580 controls and may be preprogrammed with instructions stored in a memory for execution by a processor in controlling the interactive skin, such as what content is displayed on the interactive skin. The control circuit also enables the interactive display to be controlled by a user. Illustratively, control is by user interaction with the interactive skin.

In one embodiment, the display rendered on interactive skin as previously explained provides a user interface for controlling the interactive skin. But as previously explained, interactive skin 20 may be controlled from within or without the wearable, such as by using a programming display 590 inside or outside the wearable to program the interactive skin. Communication between the controller and the interactive skin may be as previously explained.

Control circuitry 580 may be used to run software such as internet browsing applications and voice-over-internet-protocol (VOW) telephone call applications. The control circuitry may be used to run software such as email applications, media playback applications, operating system functions, and so on.

Control circuitry 580 may be used to configure and operate display pixels and touch sensitive elements associated with touch-sensitive interactive skin 20. For example, control circuitry 580 may be used to illuminate or inactivate portions of interactive skin 20 to create active and inactive regions. As another example, control circuitry 580 may be used to change the operating mode of the interactive skin and/or the functional mode of interactive skin 20 based on, for example, touch-input to touch-sensitive interactive skin 20 or other user input. For example, when a user touches a virtual button on either the interactive skin 20 or on programming display 590, control circuitry 580 may take appropriate action. For example, contact between a user finger or other external object and a virtual button may direct the interactive skin 20 to take actions such as displaying information for a user. It may make a volume adjustment to media that is being played to the user. It may control media playback. It may take an action associated with a wireless communications session. Alternatively, it may take other suitable action.

One or more virtual buttons such as virtual button on the interactive skin 20 may be used to form volume adjustment switches such as sliding controls. It may form ringer s, on/off s, sleep buttons. It may also form customized buttons which may be specific to a particular program or operating system and that may change in real time during use of interactive skin 20. In another embodiment, virtual buttons may be labeled such as with particular colors, patterns, icons, text, or other information. This may assist a user in identifying the function of the button.

Touch-sensitive interactive skin 20 may have regions blocked from view using masking structures. For instance, portions of the wearable may block regions from view, such as portion 225 in FIG. 2A. Alternatively, a patterned opaque masking layer may be used. Regions may also be formed by inactive pixels. Control circuitry 580 may be used to configure touch-sensitive interactive skin to have regions with inactive pixels. As shown in FIG. 4A, regions may be controlled, by electrical signals applied by control circuitry to conductive traces 522.

Conductive traces 522 may be electrically coupled to control circuitry 580. Conductive traces may be control lines for display pixels in regions. Interactive skin 20 may have additional control circuitry such as control lines, drive lines, and so on along a peripheral edge of interactive skin 20. Providing interactive skin 20 with control circuitry in regions may reduce the area required for control circuitry on the peripheral edge of interactive skin 20. Providing interactive skin 20 with control circuitry in regions may also allow for multiple displays. Control circuitry may also control a plurality of interactive skins within or outside the wearable. They may be coupled to control circuitry 580 using a common interconnect. Connecting multiple displays to control circuitry 580 using a common interconnect may help reduce the space required for interconnects.

As shown in FIG. 4A, side surface display portions 524 may include illuminated touch-sensitive regions 526. Control circuitry 580 may be used to configure touch sensitive interactive skin 20 to illuminate pixels in illuminated touch-sensitive regions 526 and to turn off, or make inactive, remaining pixels in side display portions 524. Illuminating pixels in illuminated touch-sensitive regions 526 and making inactive other pixels in side display portions 524 may separate center surface display portion 522 from illuminated touch-sensitive regions 526.

Illuminated touch-sensitive regions 526 may be configured to remain stationary in side surface display portions 524 or may be repositioned in side surface display portions 524 during normal use of interactive skin 20 using control circuitry 480. If desired, illuminated touch sensitive regions 526 may occupy all or substantially all of side surface display portions 524. Virtual buttons 526 may be reconfigured during use of interactive skin 520. For example, interactive skin 520 may use side region 524 to display a first set of buttons when operated in one mode and may use region 524 to display a second set of buttons which may be different when operated in another mode.

A touch-sensitive region 524 may be used to form one or more selection buttons for selecting a software application to be run on interactive skin 20 using control circuitry 580. Selection buttons may include illuminated icons associate with selected software applications. The software applications may include text messaging, calendar, camera, and calculator. They may include media player, web browser, email client, cellular telephone, or other software applications. A selected software application may be activated using a touch input to a portion of illuminated touch-sensitive region 526 associated with a selected selection button. Alternatively it may be activated by touching a region on programming display 590 of control circuitry 580 or by a manual keyboard entry mechanism. For instance, selecting a camera application button on interactive skin may cause selection buttons on illuminated touch-sensitive region 526 on interactive skin to be replaced by function buttons associated with the selected application. Alternatively, selecting a camera application button on programming display 590 of control circuitry 480 may do the same.

Illuminated touch-sensitive region 522 may display a list associated with a media player software application on interactive skin 20. In one example, illuminated touch-sensitive region 522 may display a scrollable list of song titles. Swiping edge region 524, or other region, of interactive skin in one direction may cause the illuminated touch-sensitive region 522 of interactive skin 20 to display song titles. Swiping edge region 524 or other region, of interactive skin 20 in a different direction may cause interactive skin 20 to display a different list associated with the same software application. For example, artist lists, album lists, and playlist lists. As further examples, video lists, genre lists, webcast lists, audio book lists, and so on.

In one embodiment, interactive skin 20 may be received in a recess defined inside the panel of the wearable. The interactive skin may be hermetically sealed by a transparent layer. The interactive skin may be configured to be environmentally friendly. The transparent layer may extend across the recess or illustratively across the entire panel. As previously explained, an opening may be provided for an audio or other output. The opening may be overlaid with output functionality friendly material. For example, for an audio output, the material may be of the kind used for outdoor speaker to keep water from ruining speakers.

The interactive skin of this disclosure may be assembled using conventional processes. For example, where interactive skin is configured using flex technology, the assembly may be in accordance with conventional flex technology processing. The interactive skins may be integrated into the external panel of the wearable in the form factor of handbag 10 by overlay or receipt within a portion of the external panel of the wearable in the form factor of handbag during the assembly of the external panel of the wearable in the form factor of handbag 10 and the assembly of that portion to the handbag.

Figure 5A:
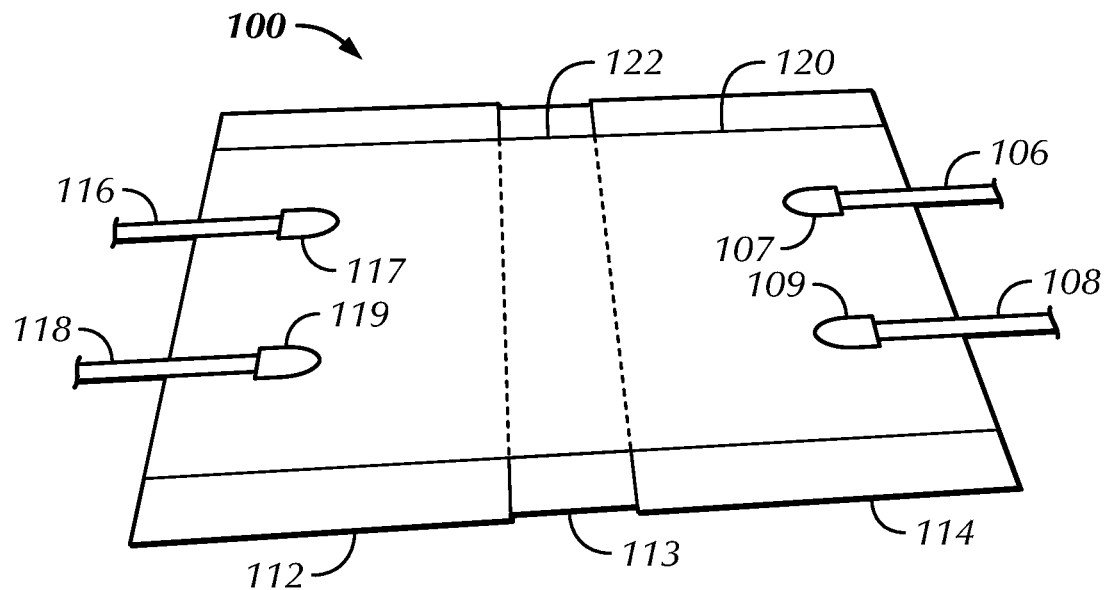
FIGS. 5A and 5B depict illustrative handbag with which an interactive skin of this disclosure may be used.
Figure 5B:
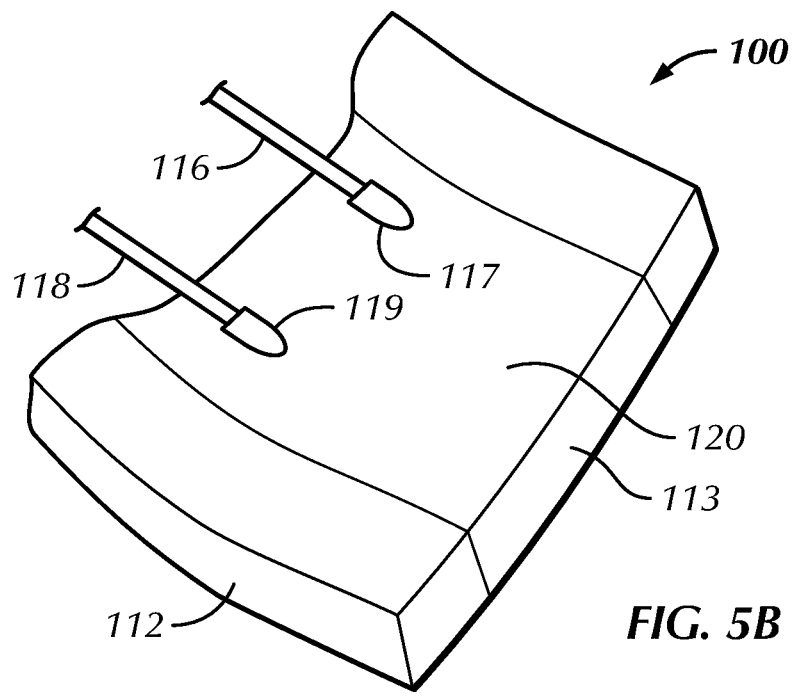

FIG. 5 depicts an illustrative handbag 100 with which an interactive skin of this disclosure may be used. FIG. 5A shows wearable 100 including a front panel 112, a back panel 114, and a pair of handles or straps on front panel 112 with portions 116, 118 having terminating ends 117, 119 that may be attached to the front panel of the handbag. A pair of handles or straps on back panel 114 with portions 106, 108 have terminating ends 107, 109 that may be attached to the back panel 114 of the handbag 100. An interactive skin 120 extends across front panel 112, bottom panel 113, and back panel 114 in this illustrative example. FIG. 5B depicts the wearable 100 of FIG. 5A in an assembled state.

Figure 6A:
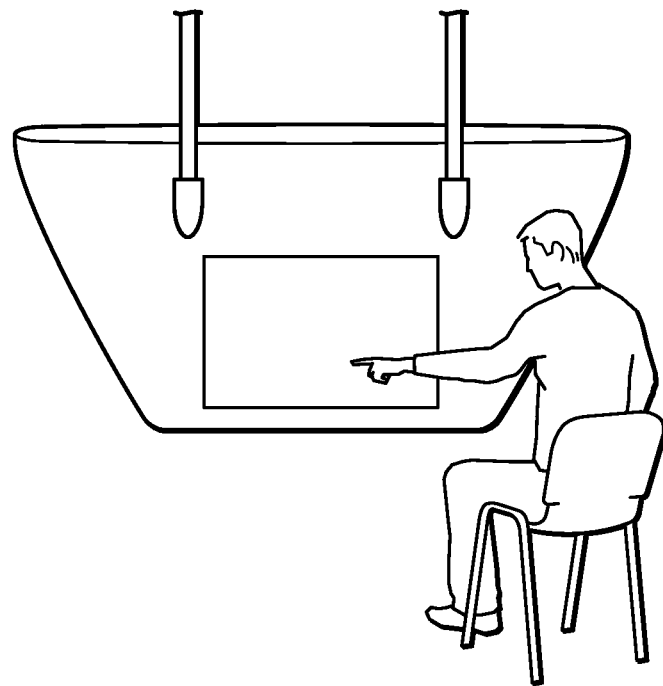
FIGS. 6A and 6B depict some illustrative uses of a wearable in the form factor of a handbag with interactive skin in accordance with an embodiment of the present disclosure.
Figure 6B:
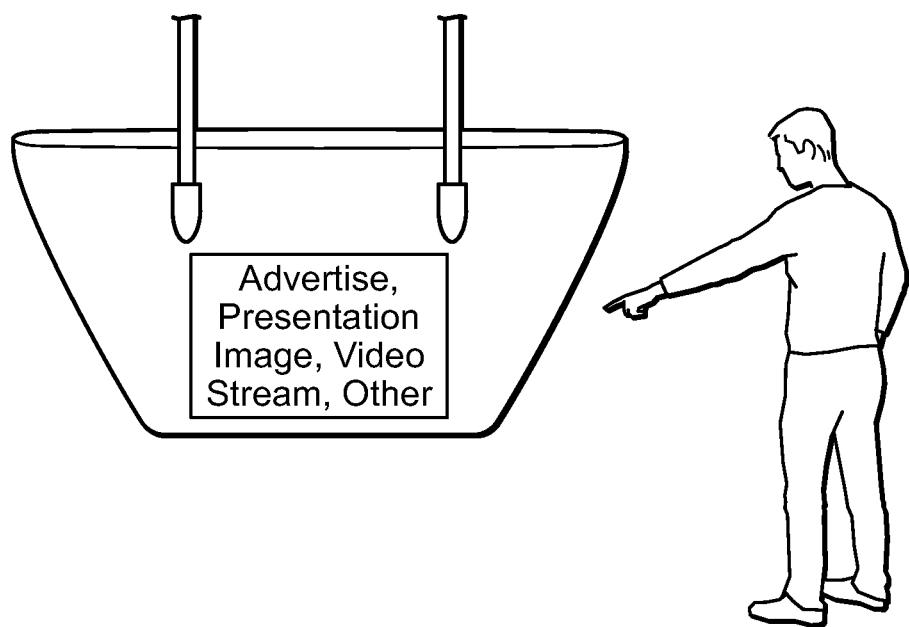

The interactive skin of this disclosure has many uses. FIG. 6 depicts a user interacting with the interactive skin adapted to the external panel of a wearable in the form factor of handbag 10. In FIG. 6A the user is employing the interactive skin in a wearable for infotainment and connectivity purposes. In FIG. 6B a user has employed the interactive skin in his wearable for information broadcast purposes. In the figure, the illustrative skin is configured to broadcast advertisement, a presentation, an image, a video stream and other information. The interactive skins may be configured to display one or more colors, texts, designs, pictures, videos, or to broadcast one or more sounds, music, or a combination of one or more of these or other input output functionalities.

One or more interactive skins may be used to configure the appearance of the wearable. For example, a predetermined number of interactive skins may be programmed to have a predetermined color on one day and a different predetermined color on another day. Thus, the wearable may appear red on one day and blue on a different day. This allows the user of the wearable to customize his or her wearable to a mood, occasion, for fun, or for other reasons. A handbag may be programmed with a color or scheme of colors to reflect a user's mood or message of the day. Thus, this disclosure may allow a wearable to be configured to express the emotive of a user.

As another example, a predetermined number of interactive skins may be programmed to have a color scheme to present a theme. For example, the interactive skins may be programmed to have one or more interactive skins each display the American flag in which case the wearable may display one or a plurality of American flags. In another embodiment, two or more or a cluster of the interactive skins may each display a different portion of the American flag such that when displayed collectively, the interactive skins depict an overall appearance of one American flag. Any one or more interactive skins may be configured to display the foregoing or any color scheme, words or messages, audible sounds, music generation, audio, video and so on. In addition any one or more interactive skins may be programmed to vary its display over time to another color scheme, words or messages, audible sounds, music generation, audio, video and so on. Any one or more interactive skin may be programmed to dynamically vary its display based on conditions such as time, night or day, heat, sunny or cloudy day. For example, one or more interactive skin may be configured to display the color red during the day and the color white at night; the white color being more visible in the night time and so may be more safe. One or more interactive skins may be configured to display the color blue on a sunny day and yellow on a cloudy day to mirror the mood of the user.

Any one or more interactive skin may be programmed to vary the input and output functions that may be possible with the interactive skin of this disclosure at different times. For example, when the wearable is set down, one or more interactive skin may be configured to activate sensors associated with the interactive skin to provide a security system for the wearable against theft. The sensors may detect a motion such as the opening of wearable or removal of an item that may alert a person to theft.

The interactive skin of this disclosure may be configured to be password protected so that only the user or those who have been provided the password may activate the touch feature of the interactive skin of this disclosure. In this way, the interactive skin is only touch responsive to someone who knows the password for interacting with the interactive skin. For instance, a touch may cause the interactive skin to display a keyboard for entry by a user of the password. On proper entry of the password, the interactive skin may allow further interaction by the user with the interactive skin.

Some functionality of the interactive skin of this disclosure has been previously described by illustrative examples which is not limiting. Other applications of the interactive skin of this disclosure are also covered by this disclosure. By way of further example, FIG. 7 depicts a set of functions that may be provided to the interactive skin of this disclosure. This functionality includes an audio plug receptacle 1110, a connector receptacle 2000, one or more user input components 1120, one or more output components 1160, control circuitry 1130, graphics circuitry 1170, a bus 1115, a memory 1140, a storage device 1180, communications circuitry 1150 and POM (position, orientation or movement sensor) or other sensors 1190.

Control circuitry 1130 has been previously explained and may be dedicated to an interactive skin of this disclosure or to a plurality of interactive skins of this disclosure. The control circuitry may be the control circuitry that controls a vehicle system. The control circuitry may be a control circuitry associated with a smart phone or other wireless device. The control circuitry may be a control circuitry associated with a computer device. Other control circuitry may be useable with the interactive skin of this disclosure.

Memory 1140 has been previously described and may reside in proximity or removed from the interactive skin of this disclosure. Input component and output component may provide a user with enhanced ability to interact with wearable. For example, input component 1120 and output component 1160 may provide an interface for a user to interact with an application running on control circuitry. Input component may take a variety of forms, such as a keyboard/keypad, trackpad, mouse, click wheel, button, stylus or touch screen. Input component may also include one or more devices for user authentication (e.g., smart card reader, fingerprint reader or iris scanner) as well as an audio input device (e.g., a microphone) or a video input device (e.g., a camera or a web cam) for recording video or still frames. Output components may include any suitable display, such as a liquid crystal display (LCD) or a touch screen display, a projection device, a speaker or any other suitable system for presenting information or media to a user. Output component 1160 may be controlled by graphics circuitry. Graphics circuitry 1170 may include a video card, such as a video card with 2D, 3D or vector graphics capabilities. In some embodiments, output component may also include an audio component that is remotely coupled to wearable. For example, output component may include a headset, headphones or ear buds. These may be coupled to wearable with a wire or wirelessly, such as by Bluetooth headphones or a Bluetooth headset, or optically.

There may be one or more applications such as software applications stored on storage device or in memory. Control circuitry may be configured to execute instructions of the applications from memory. For example, control circuitry may be configured to execute a media player application that causes full-motion video or audio to be presented or displayed on interactive skin or an output component. Other applications may illustratively include a telephony application, a GPS navigator application, a web browser application, a calendar or organizer application. Interactive skin may also execute any suitable operating system, such as a Mac OS, Apple iOS, Linux or Windows. The system may include a set of applications stored on storage device or memory that is compatible with the particular operating system.

In some embodiments, the interactive skin of this disclosure is provided with or coupled to communications circuitry to connect to one or more communications networks. Communications circuitry 1150 may be any suitable communications circuitry operative to connect to a communications network and to transmit communications (e.g., voice or data) from interactive skin or wearable coupled to interactive skin to other devices within the communications network. Communications circuitry may be operative to interface with the communications network. The communications circuitry may do so using any suitable communications protocol such as, Wi-Fi (such as, a 802.11 protocol), Bluetooth, high frequency systems (such as, 900 MHz, 2.4 GHz and 5.6 GHz communication systems), infrared, GSM, GSM plus EDGE, CDMA, quad band and other cellular protocols, VOIP or any other suitable protocol.

Communications circuitry may be operative to create a communications network using any suitable communications protocol. Communications circuitry may create a short-range communications network to connect to other devices using a short-range communications protocol. For instance, communications circuitry may be operative to create a local communications network using the Bluetooth protocol to couple to a Bluetooth headset or other Bluetooth device. Communications circuitry may include a wired or wireless network interface card (NIC) configured to connect to the Internet or any other public or private network. For instance, interactive skin may be configured to connect to the Internet via a wireless network. The network may be packet radio network, an RF network, a cellular network or any other suitable type of network. Communication circuitry may initiate and conduct communications with other communications devices or media devices within a communications network.

The interactive skin of this disclosure may be provided with or coupled to other components suitable for performing a communications operation. For instance, the interactive skin may include or have associated with it a power supply. The power supply may be a battery, a lithium battery, a solar battery, and so on. The power supply may be provided by other sources, such as supplied by a computing device, such as a smartphone, associated with the interactive skin.

As other examples, the interactive skin may include or have associated with it an antenna, ports or interfaces for coupling to a host device, a secondary input mechanism such as an ON/OFF switch or any other suitable component.

The interactive skin of this disclosure may be provided with or coupled to POM or other sensors. These sensors may be used to determine the approximate geographical or physical location of interactive skin. This may allow the location of an interactive skin or its associated wearable or other wearables in communication therewith to be derived from any suitable trilateration or triangulation technique. In this illustrative example, POM sensors may include an RF triangulation detector or sensor or any other location circuitry configured to determine the location of interactive skin and/or its associated wearables.

POM sensors 1190 provided with or coupled to interactive skin may also include one or more sensors or circuitry for detecting the position orientation or movement of interactive skin or a wearable or wearables associated with interactive skin. Such sensors and circuitry may illustratively include single-axis or multi-axis accelerometers, angular rate or inertial sensors (such as, optical gyroscopes, vibrating gyroscopes, gas rate gyroscopes or ring gyroscopes), magnetometers (such as, scalar or vector magnetometers), ambient light sensors, proximity sensors, motion sensor (such as, a passive infrared (PIR) sensor, active ultrasonic sensor or active microwave sensor) and linear velocity sensors. For instance, control circuitry may be configured to read data from one or more of POM sensors in order to determine the location orientation or velocity of an interactive skin or wearable or wearables associated therewith. One or more of POM sensors may be positioned above, below or on either side of the display presented by the interactive skin of this disclosure. The sensor may also be positioned near an output component such as a speaker.

Other sensors may also be provided such as explained below.

Control circuit 1130 may be powered by a power source of the wearable. The power source may be a battery, such as a lithium battery, a solar panel, etc. In an embodiment wherein the control circuitry is provided by a computing device such as a smart phone, mobile computing or other computing device, the power source of the device may power the control circuitry. The interactive skin of this disclosure may be provided with its own dedicated power source sized to meet the power requirements demanded by the functionality provided by the interactive skin.

Software may be used to manage power consumption by the interactive skin. For example, power to the interactive skin may be throttled based on power source requirements. For instance, when available power falls below predetermined levels, power to the interactive skin may be turned entirely off or functionality provided by the interactive skin may be throttled back.

The interactive skin may be provided with varying combinations of the foregoing electronic components. For example, an interactive skin may be provided with a GPS sensor and a controller and communication circuitry to allow the whereabouts of the interactive skin or wearable associated therewith to be tracked. This may allow people who are kidnapped to be tracked and found or wearables to be recovered such as that are stolen. As another example, an interactive display may include an audio jack. Any combination of components to configure the interactive skin with the desired smarts may be used to achieve the desired functionality.

Additionally, the wearable may include other electronic functionality, such as a loudspeaker 1194 or microphone 1192 to enable a user to interact with the interactive skin in this way.

FIG. 8 shows aspects of an illustrative footwear configured as or with an interactive skin in accordance with an embodiment of the present disclosure. FIGS. 8A-8C depict illustrative woman's heel footwear. FIG. 8D depicts an illustrative sneaker footwear and FIG. 8E another illustrative footwear.

Figure 8A:
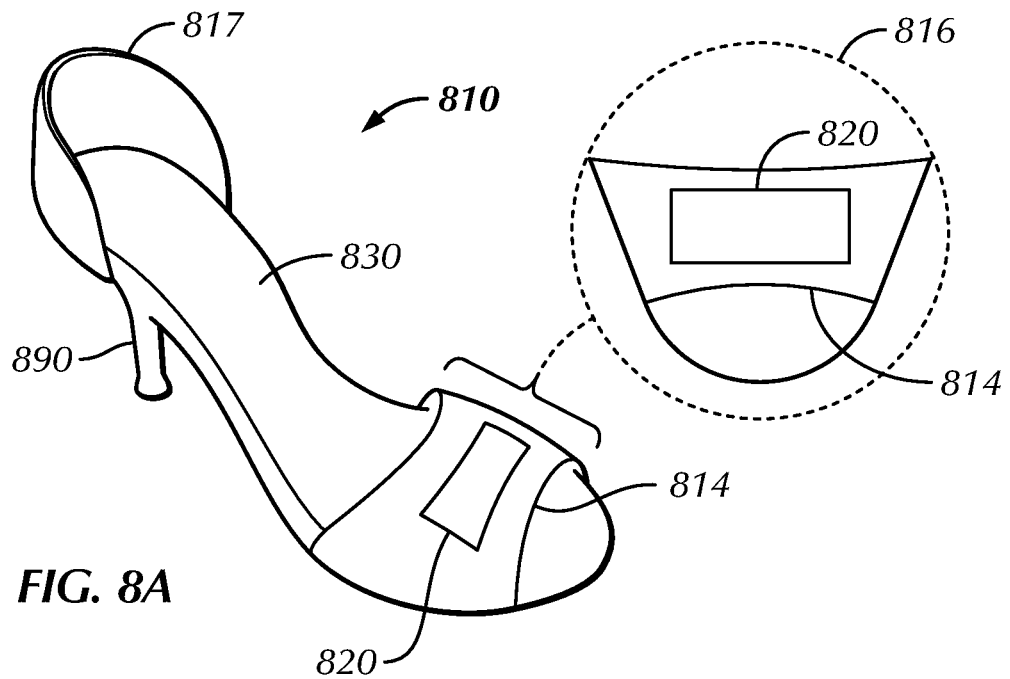
FIG. 8A-FIG. 8F show aspects of an illustrative footwear configured as or with an interactive skin in accordance with an embodiment of the present disclosure.
Figure 8B:
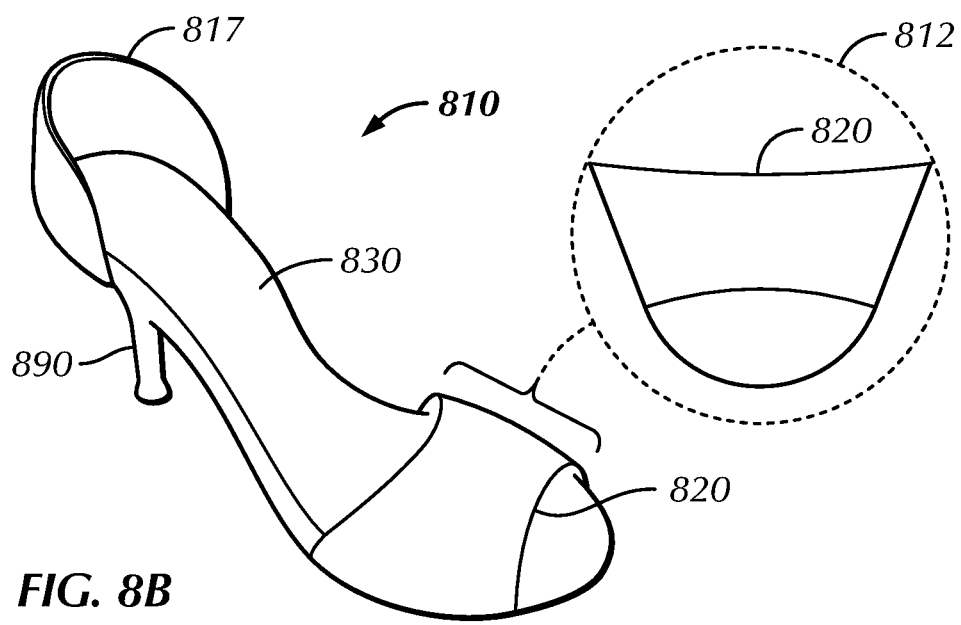

FIGS. 8A-8E illustrative wearable 810 in the form factor of woman heel footwear include a sole 840 (shown in FIG. 8D), a lining piece 830, a top front piece 814, a back piece 817, and a heel 890. As shown in FIG. 8A, an interactive skin 820 may overlay or be received within or form an integrated part of a portion of the top front piece 814 of the wearable in the form factor of woman heel. In illustrative embodiment depicted in FIG. 8B, interactive skin 817 may overlay or be received within or form an integrated part of substantially all or all of the wearable in the form factor of woman heel.

Figure 8C:
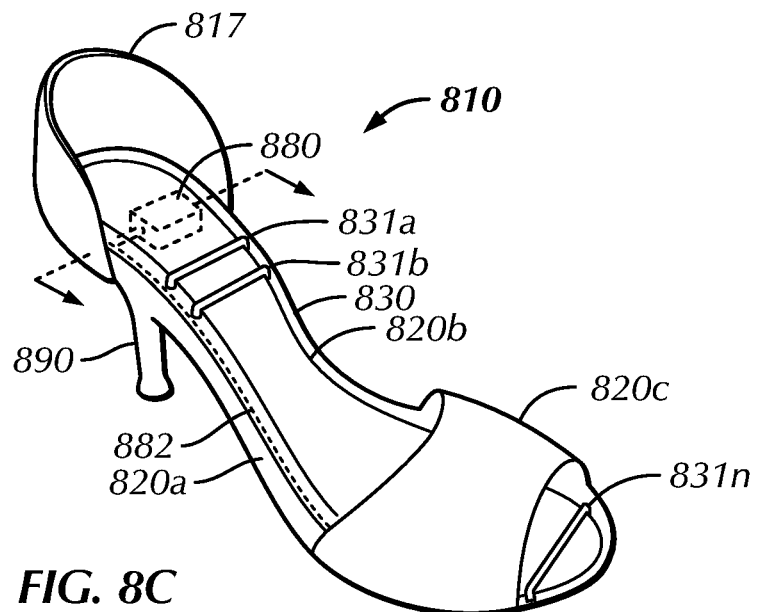

In illustrative embodiment depicted in FIG. 8C, interactive skin 820a may overlay or be received within or form an integrated part of part of or substantially all or all of the sole 840 or side of the sole of the wearable in the form factor of woman heel. FIG. 8C also depicts interactive skin 820b may overlay or be received within or form an integrated part of part of or substantially all or all of the lining 830 of the wearable in the form factor of woman heel. FIG. 8C also depicts interactive skin 820c may overlay or be received within or form an integrated part of part of or substantially all or all of the top front piece of the wearable in the form factor of woman heel.

The interactive skins 820a, 820b, and 82c may be configured as depicted in FIG. 3. Because interactive skin 820b may absorb a significant amount of loading from the wearer of the heel, to prevent harm to the flexible display layer 22 and touch sensitive layer 24 from such loading, the interactive skin may be provided with a load minimizing structure configured to prevent loading of the user from breaking or interfering with the operation of the flexible display layer 22 and touch sensitive layer 24 while allowing all, or substantially all, or a portion of light containing information displayed on interactive skin to pass through. In one illustrative embodiment, ribbings 831a, 831b through 831n (ribbings in between 831b and 831n are not depicted in the illustrative drawing) are provided and a transparent lining not shown may be extended above and along the ribbings. The transparent lining may illustratively be affixed to the ribbing by an adhesive. The ribbings may protect the flexible display layer 22 and touch sensitive layer 24 from damage from user loading by distributing the loading across the ribbings and to the sole. The transparent lining may cushion the foot. Light from the interactive skin may pass through the transparent lining along sides, front and back of the foot as well as through the toes to the wearer or observer. In one illustrative embodiment, the ribbings are illustratively made from transparent material so as to allow more of the light from the interactive skin to pass through.

The foregoing teachings on ribbings and other load distribution structures may apply to the use of an interactive skin in a portion of a wearable that bears a load that may affect the performance of the interactive skin. For instance, as explained in FIG. 2C, interactive skin may also be provided on the pair of handles 19a and 19b of a wearable in the form factor of a handbag. In such case where the loading created by holding the handles comes into play, the holding loading may be distributed down to the panels through the use of ribbings as just explained.

Interactive skin 820b depicted in FIG. 8C and interactive skin 20 of wearable 10 in the form factor of handbag depicted in FIG. 2C, as well as any interactive skin of this disclosure may illustratively be programmed according to this disclosure. For instance, the interactive skin may be programmed to render a color, a color scheme, have sound projected from outputs associated with the interactive skin. In an illustrative embodiment, interactive skin 20 of wearable 10 in the form factor of handbag depicted in FIG. 2C, may be configured to emit a white light, which may shine from the bottom of the handbag, filter through the components contained in the handbag, and be seen by a user or observer at the top of the handbag. The white light may illuminate the contents inside the handbag to allow a user to easier find things inside the bag. Another color, or pattern of color, or sounds, or theme, or images or texts or other outputs from the interactive skin or components associated therewith may be generated. For instance, the light may strobe the white light, or change the lighting from red to white to blue or play a song on opening of the handbag. The interactive skin may be configured with any output function taught by this disclosure.

Figure 8D:
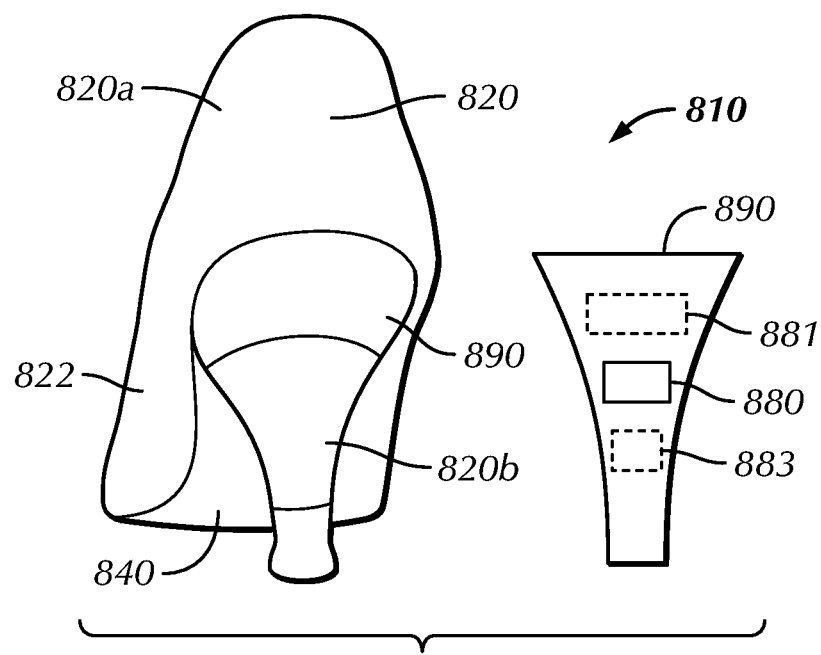

In illustrative embodiment depicted in FIG. 8D, interactive skin 820a may overlay or be received within or form an integrated part of part of or substantially all or all of the back piece 817 and side piece 822 of the wearable in the form factor of woman heel. FIG. 8D further depicts interactive skin 820b may overlay or be received within or form an integrated part of part of or substantially all or all of the heel 890 of the wearable in the form factor of woman heel.

The interactive skin of this disclosure may overlay or be received within or form an integrated part of part of or substantially all or all of any piece of the wearable in the form factor of woman heel. The interactive skin 820 may be bent to contour the piece of the wearable. Alternatively, interactive skin 820 may be configured to provide the panel of the wearable with a predetermined contour.

FIG. 8C further depicts wearable including a controller 880 integrated into the wearable. A control line 882 is depicted to illustrate a control line between the controller 880 and any one or more interactive skin, in this case interactive skin 820c, over which communication may occur between controller and interactive skin. Control lines from the controller 880 may run to other interactive skin that is part of the wearable.

FIG. 8D depicts an illustrative embodiment wherein controller 880 may be integrated into heel 890 of the wearable. Alternatively, the controller or other electronics associated with the wearable may be integrated into portions 881, 883 of any other portions of the heel or wearable.

Figure 8E:
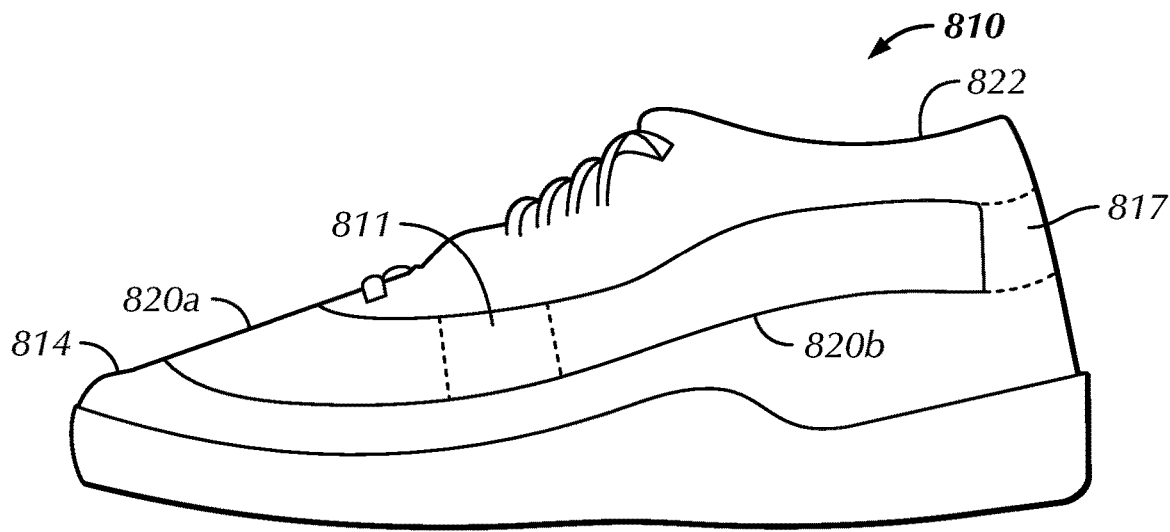

FIG. 8E depicts an illustrative sneaker footwear including a side portion 822 and a front portion 814. An interactive skin 820a of this disclosure may overlay or be received within or form an integrated part of the front portion 814 of the wearable in the form factor of woman heel. An interactive skin 820b of this disclosure may overlay or be received within or form an integrated part of the side portion 822 of the wearable in the form factor of woman heel. In another illustrative embodiment, interactive skin 820a and interactive skin 820b may configured as a single interactive skin that extends below the side portion 822 of the wearable along area 811. Alternatively the interactive skin may extend along the side portion 822 and include inactive areas such as the area of the interactive skin extending along area 811. Similarly, the back portion 817 may include an interactive skin and be active or inactive along the back portion or extend below the back portion 817. The interactive skin of this disclosure may be configured to not cover the back portion 817 or other portions of the wearable. A single interactive skin may circumnavigate the different portions of the wearable and be active, inactive, or extend below a portion at any point. For example, the inside portion of the sneaker depicted in FIG. 8E may have an interactive skin of its own or be part of a single interactive skin that extends across both sides of the wearable.

Figure 8F:
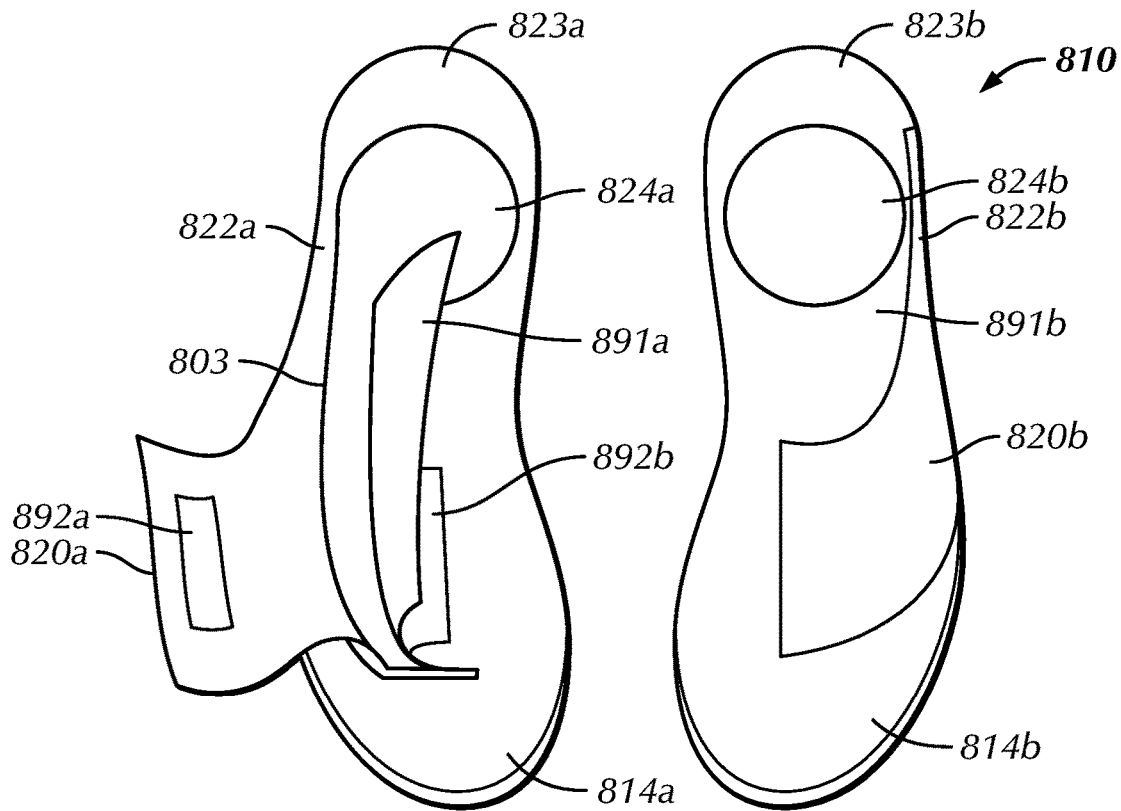

FIG. 8F depicts an illustrative wearable 810 in the form factor of a pair of footwear. The pair includes a front portion 814a, 814b, a side portion 822a, 822b, a back portion 823a, 823b, an opening 824a, 824b for receiving the pair of feet, and an interactive skin 820a, 820b according to the teachings of this disclosure. Interactive skin 820b is depicted folded over onto front portion 814b of one footwear. In the other footwear, interactive skin 820a is depicted folded back and away from front portion 814a of the footwear. An underside of the interactive skin 820a, 820b may be provided with an attachment mechanism, illustratively Velcro, which is shown as attachment mechanism 892a on the underside of interactive skin 820a. The attachment mechanism 892a may be configured to attach to attachment mechanism 892b on the front portion 814b of the footwear.

When a wearer has put on the footwear, or when the footwear has been taken off and put away, interactive skin 820b overlays a top portion 891b and front portion 814b of the footwear. To put on the footwear in this illustrative embodiment, the interactive skin 820a is first folded back and then the front portion 891a of the footwear is also folded back. This increases the opening 824a to allow a foot to slip into the footwear. The opening 824a is increased by the additional opening created by the opening along edge 803 of the footwear which allows more opening for the foot to slip into the footwear. Once the foot is inserted into the footwear, the fold in the top portion 891b is unfolded so that the top portion 891b and the front portion 814a lies across the opening along edge 803. The fold in the interactive skin 820a is then unfolded so that it lies across the top portion 891b and front portion of the footwear. The attachment mechanism 820a may then attach with the attachment mechanism 892b on the front portion 814a of the footwear to keep the interactive skin and the top portion 891b and front portion 814a together.

The interactive skin of this disclosure may take any shape. The interactive skin may be flexible and bend and take the contour of a wearable it is associated with. The interactive skin may form the wearable such as explained in FIG. 2C.

FIG. 9A-FIG. 9F show aspects of an illustrative apparel in the form factor of a coat or a jacket configured as or with an interactive skin in accordance with an embodiment of the present disclosure.

Figure 9A:
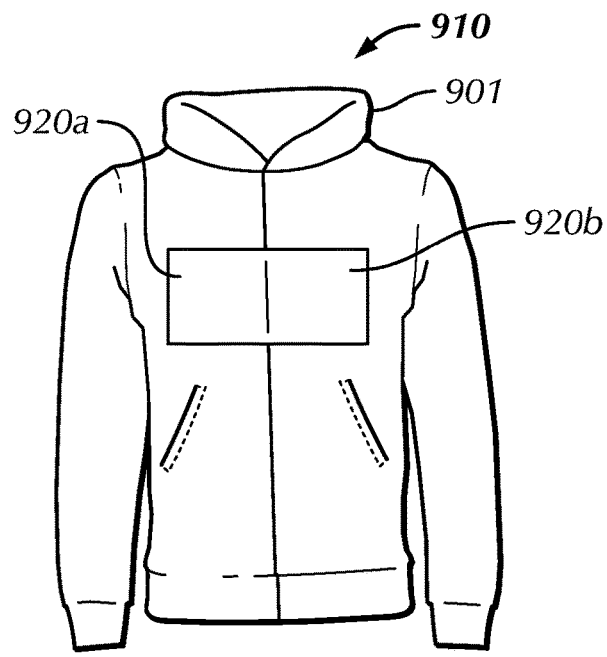
FIG. 9A-FIG. 9F show aspects of an illustrative apparel in the form factor of a coat or a jacket configured as or with an interactive skin in accordance with an embodiment of the present disclosure.
Figure 9B:
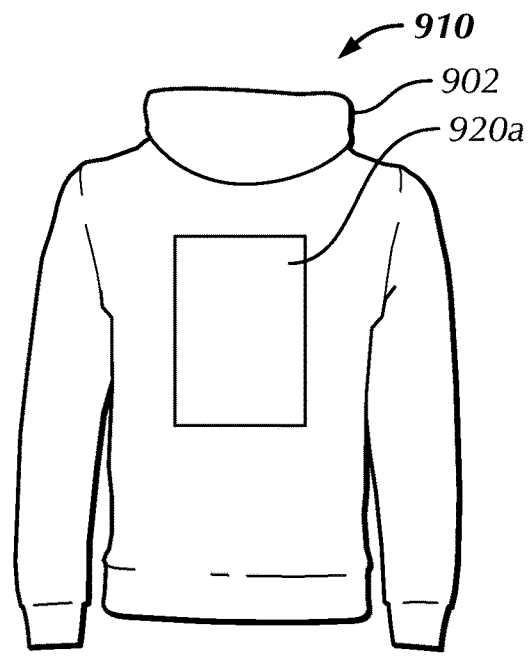

FIG. 9A depicts a wearable 910 in the form factor of a parka with hood 901. FIG. 9A depicts wearable 910 including an interactive skin 920a and an interactive skin 920b along front portions of the wearable. FIG. 9B depicts a wearable 910 in the form factor of a coat with collar 902. FIG. 9B depicts wearable 910 including an interactive skin 920 along a back portion of the wearable. When used the interactive display may display information or messages. For example, to broadcast advertisement, a presentation, an image, a video stream and other information. The interactive skins may be configured to display one or more colors, texts, designs, pictures, videos, or to broadcast one or more sounds, music, or a combination of one or more of these or other input output functionalities. When not used, the coat may be draped over the back of a chair and the interactive skin may be used by anyone for interaction with the interactive skin, such as to browse the Internet.

Figure 9C:
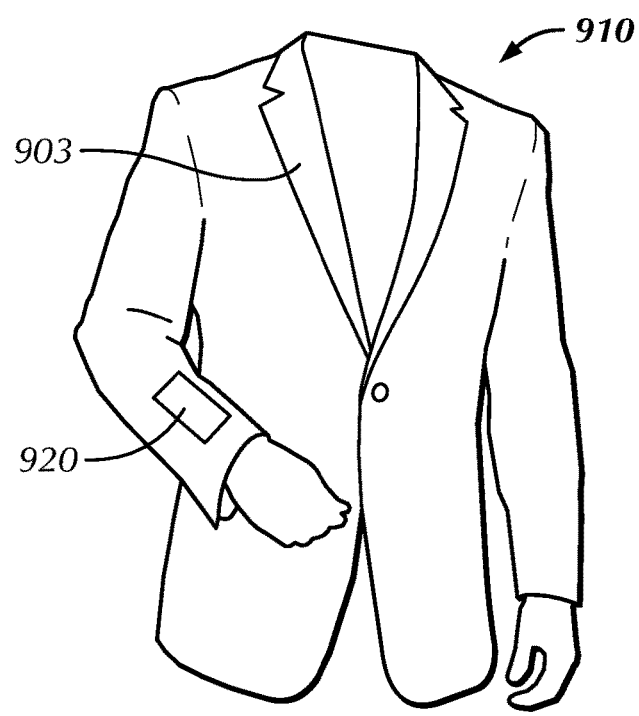

FIG. 9C depicts wearable 910 in the form factor of a jacket with lapels 903. FIG. 9C depicts wearable 910 including an interactive skin 920 along sleeve of the wearable. In FIG. 9C, the interactive skin may lie along an inner side of the interactive sleeve. Alternatively, the interactive skin may lie along an outer side of the interactive skin. The interactive skin may lie along any portion of the wearable. One or more interactive skins may be used in these illustrative embodiments and in any of the wearables as disclosed by this disclosure.

Figure 9F:
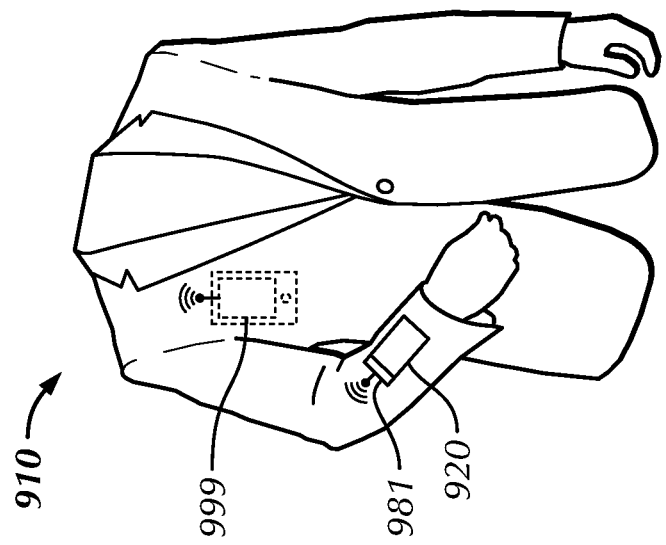
Figure 9E:
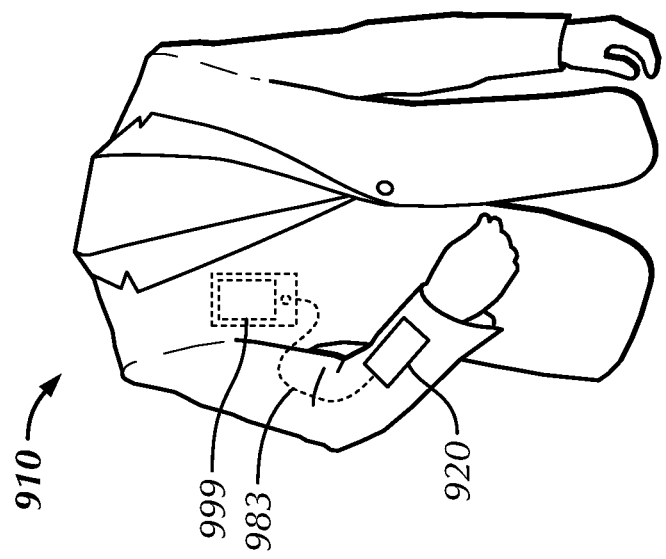
Figure 9D:
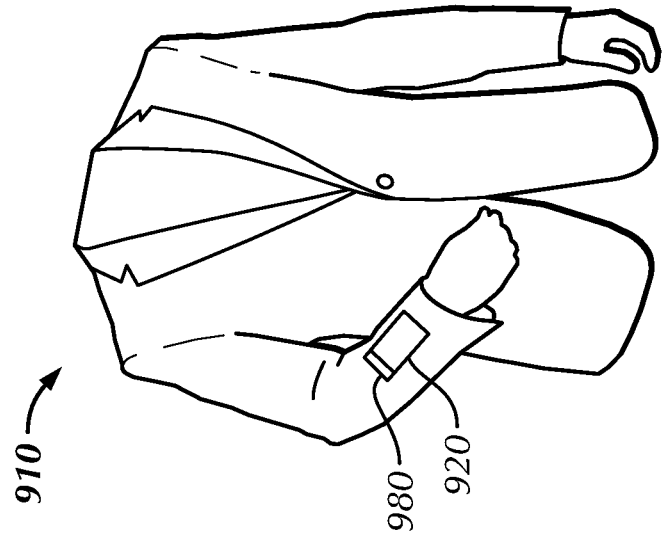

FIG. 9D depicts wearable 910 including an interactive skin 920 along an inside sleeve of the wearable and a controller 980 for controlling the interactive skin. FIG. 9E depicts wearable 910 including an interactive skin 920 along an inside sleeve of the wearable and a wire that electrically connects interactive skin to a controller 999 in the form factor of a smart phone for controlling the interactive skin. With the display provided by the interactive skin on the sleeve, the interactive skin enables a user to "wear his smartphone on his sleeve. FIG. 9F depicts wearable 910 including an interactive skin 920 along an inside sleeve of the wearable provided with wireless communication circuitry 981 to wirelessly communicate with a controller 980 in the form factor of a smart phone for controlling the interactive skin.

Figures 10A, 10B:
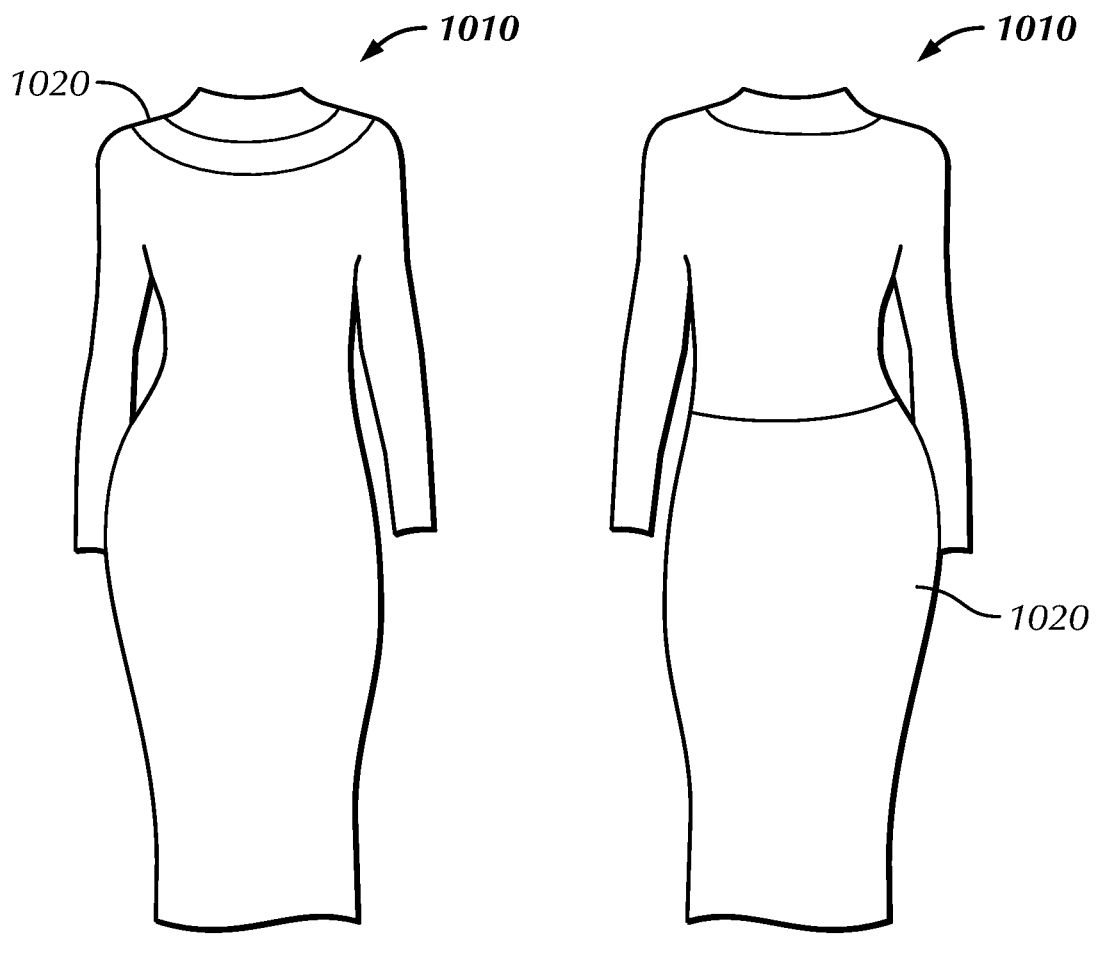
FIG. 10A and FIG. 10B show aspects of an illustrative apparel in the form factor of a dress configured as or with an interactive skin in accordance with an embodiment of the present disclosure.

FIG. 10A and FIG. 10B show aspects of an illustrative apparel in the form factor of a dress configured as or with an interactive skin in accordance with an embodiment of the present disclosure. FIG. 10A depicts wearable 1010 including an interactive skin 1020 along a collar of the wearable. FIG. 10B depicts wearable 1010 including an interactive skin 1020 along a bottom portion of the wearable.

Figure 11A:
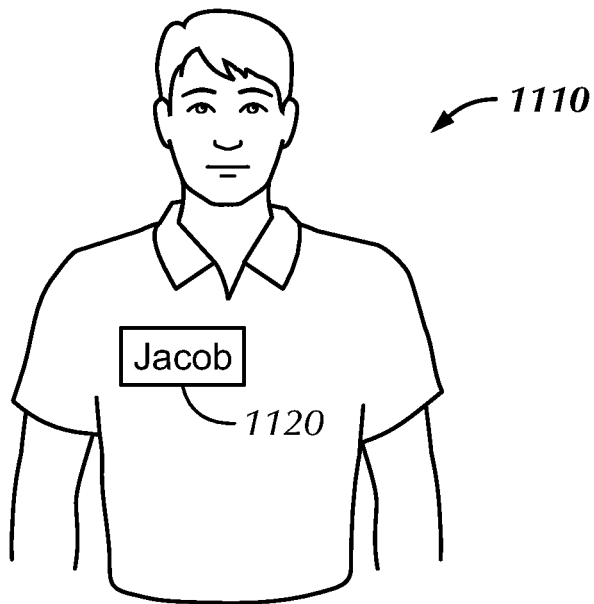
FIG. 11A and FIG. 11B show aspects of an illustrative accessory in the form factor of a name tag and necklace configured as or with an interactive skin in accordance with an embodiment of the present disclosure.
Figure 11B:
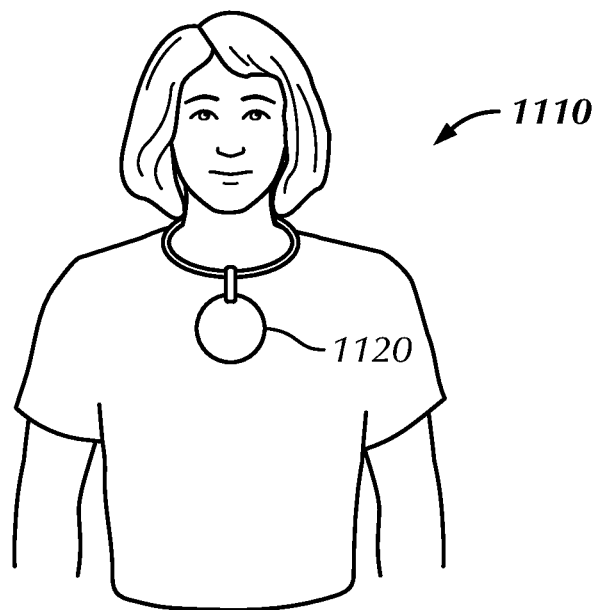

As explained in this disclosure, the interactive skin may take any shape and form and may overlay or be received within or form an integrated part of substantially all or all of an outside portion of the wearable. For instance, FIG. 11A and FIG. 11B show aspects of an illustrative accessory in the form factor of a dress in the form factor of a name tag and necklace configured as or with an interactive skin in accordance with an embodiment of the present disclosure. FIG. 10A depicts wearable 1110 in the form factor of a nametag accessory including an interactive skin 1020. FIG. 10B depicts wearable 1010 including in the form factor of a necklace including an interactive skin 1120.

FIG. 12 show aspects of an illustrative handbag for carrying an electronic component, in this example illustratively a casing for carrying a smartphone, the casing configured as or with an interactive skin in accordance with an embodiment of the present disclosure.

FIG. 12 depicts illustrative wearable 1210 in the form factor of a smart phone casing together with an illustrative electronic device, a smart phone 1211. Smart phone 1211 includes a housing 1213 with internal electronics (not shown), a display 1212, and a control button 1214. The FIG. 12 depiction of the illustrative wearable 1210 in the form factor of a smart phone casing is illustrative and a wearable in the form factor of a casing for any mobile electronic is taught by this disclosure.

The wearable 1210 includes a frame 1220 having an opening for receiving smart phone 1211. The frame may include an electrical connector 1230 configured to electrically connect to port 1216 in smart phone 1211 when the smartphone is fitted into the wearable in the form factor of a smart phone casing. The electrical connector 1230 may be a computer bus and power connector such as Lightning created by Apple configured to provide power and control interactive skin of this disclosure according to this disclosure. The electrical connector interfaces to the previously explained control lines of the interactive skin to enable the processor of the smartphone to control the interactive skin.

Figure 12A:
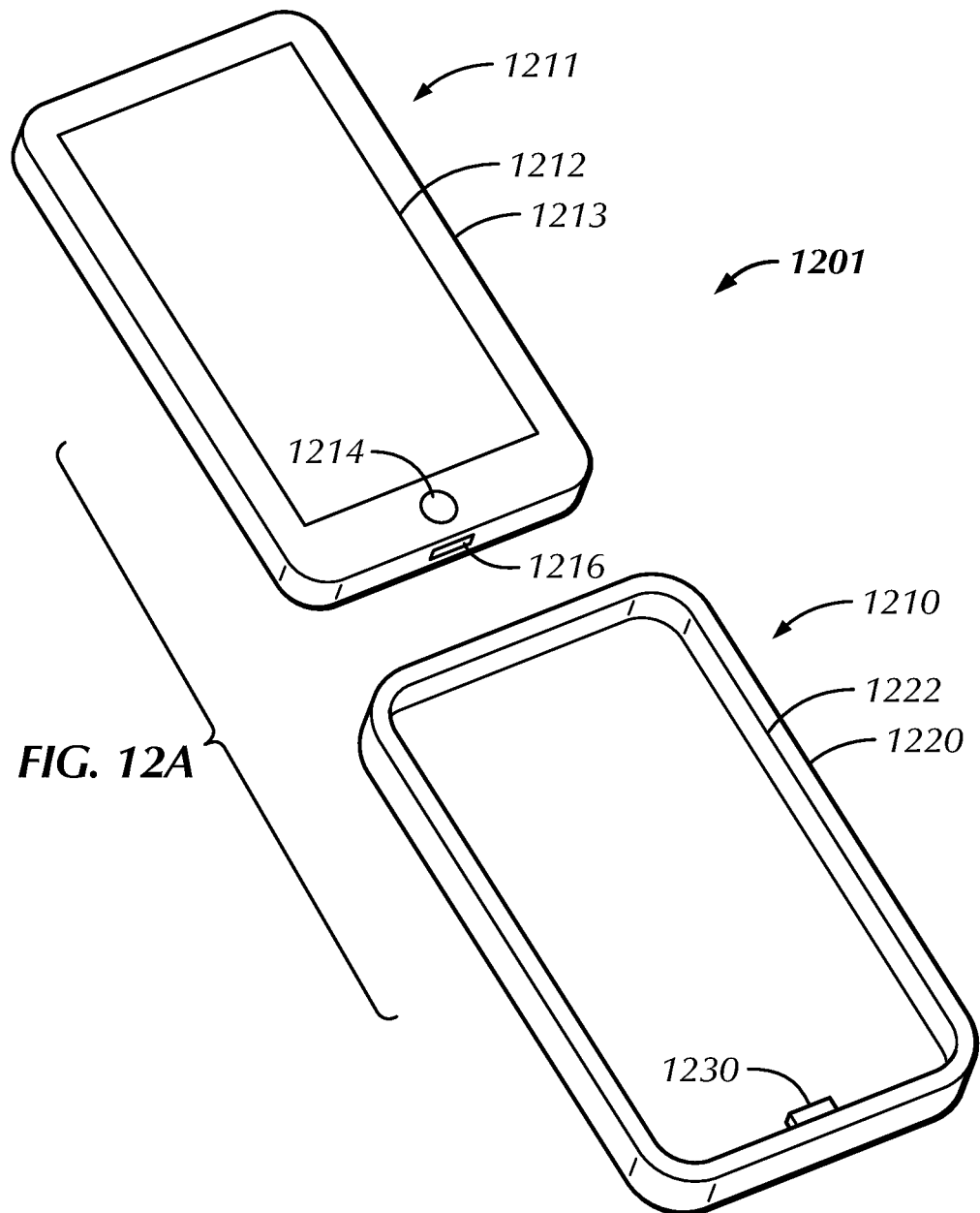
FIG. 12A-FIG. 12F show aspects of an illustrative handbag for carrying an electronic component, in this example illustratively a casing for carrying a smartphone, the casing configured as or with an interactive skin in accordance with an embodiment of the present disclosure.
Figure 12B:
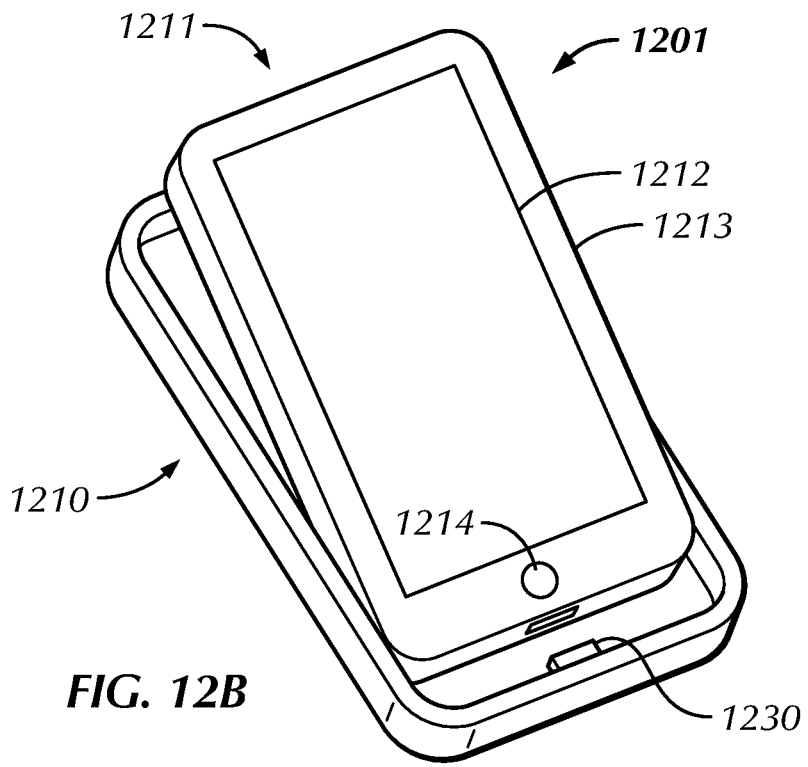
Figure 12C:
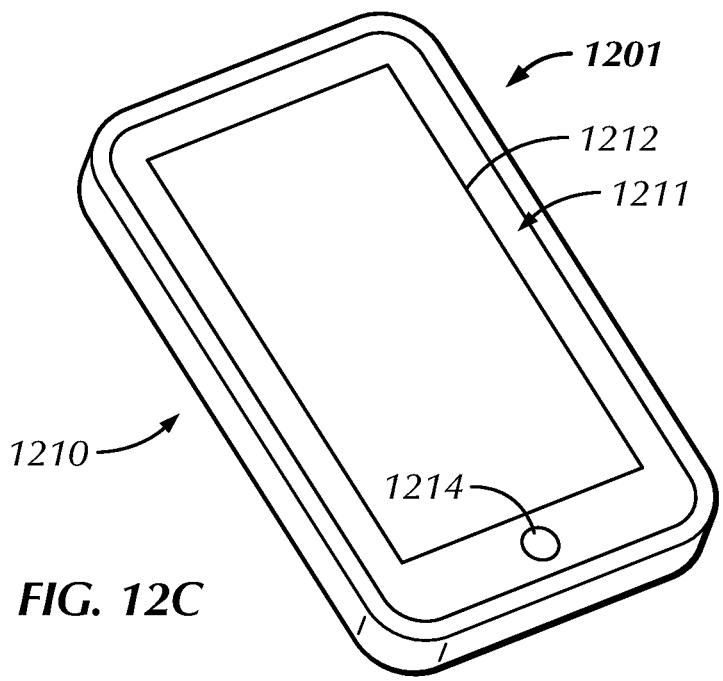
Figure 12D:
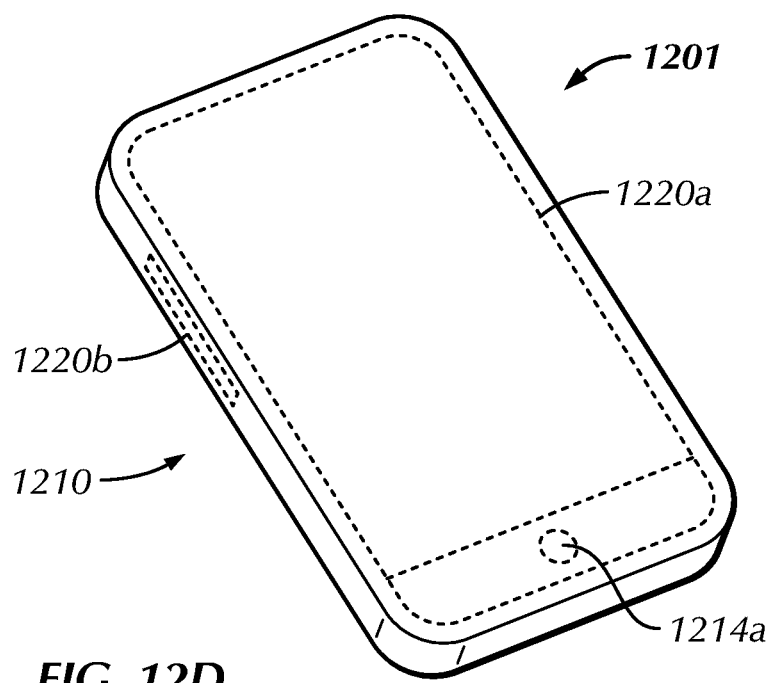

FIG. 12A depicts the smartphone 1211 and the wearable 1210 in the form factor of a smart phone casing for carrying the smartphone facing upright and in a spaced apart relationship. FIG. 12B depicts the smartphone 1211 partially slipped into the wearable 1210 in the form factor of a smart phone casing for carrying the smartphone. FIG. 12C depicts the smartphone 1211 fully slipped into the wearable 1210 in the form factor of a smart phone casing for carrying the smartphone. FIG. 12D depicts a back view of FIG. 12C to illustrate a back view of wearable 1210 in the form factor of a smart phone casing for carrying the smartphone into which smartphone 1211 has been fully slipped. As depicted in FIG. 12D, the back and side of the casing 1210 includes interactive skin 1220a and 1220b, respectively which may include a touch sensitive display as disclosed herein. Interactive skin 1220a further includes a virtual control button 1214a which may function in the same way as control button 1214 of smartphone 1211 depicted in FIG. 12A.

As previously explained, when inserting the smartphone into the wearable 1210 in the form factor of a smart phone casing, the electrical connector 1230 of the wearable is plugged into the port 1216 of smart phone 1211. When the two are interconnected, the processor of the smartphone may power and electrically communicate with the interactive skin. This may allow the processor of the smartphone to control the interactive skin, such as the active and inactive regions of the skin that may render a display in accordance with the teaching of this disclosure. In FIG. 12D depicts an interactive skin 1220a along a back side of the wearable 1210 in the form factor of a smart phone casing and an interactive skin 1220b along a side of the wearable 1210 in the form factor of a smart phone casing. As explained in this disclosure interactive skin may overlay or be received within or form an integrated part of part of or substantially all or all of the wearable 1210 in the form factor of a smart phone casing.

In this way, wearable 1210 in the form factor of a smart phone casing may provide the features explained in this disclosure that may be provided by an interactive skin in accordance with this disclosure. This includes rendering a display on the interactive skin while at the same time protecting the smartphone from scratches and absorbing any impact of the smart phone against a surface. The wearable in the form factor of a smart phone case with interactive skin may be configured to be hand held, worn as a necklace, configured as wallet, and so on.

Cases for smart phones serve many purposes. These may include protecting the smart phone from impact. Cases for smartphones may also be used to change the appearance of the smart phone. For instance, a traditional black colored smart phone may be provided with a case of a different color, such as pink, or orange, or blue. A smartphone having a traditional shape, such as the shape of a brick, may be provided with a case having a shell for receiving the smart phone but a form factor that may create a different shape or appearance, such as a case in the shape of a wristlet or having a bunny shape. Cases in these instances receive the smart phone in a way that may protect or alter the appearance of the phone while allowing the display of the smartphone to be visible through the opening of the case.

This disclosure allows the back side and sides including top and bottom sides of an electronic device such as a smart phone to be interactive with the user. As depicted in FIG. 12D, the wearable in the form factor of a case with interactive skin of this disclosure may allow the back side of the electronic device such as smart phone to be also touch responsive to the user and to provide inputs and outputs as disclosed herein. It also always touches responsive inputs and outputs on both front and back and top and bottom and sides of the electronic device smart phone. This allows a user to provide touch input and receive output from the front and back and top and bottom and sides of the electronic device such as smart phone. It also allows more than one user to use the electronic device such as a smart phone at the same time as explained below.

Moving touch inputs and outputs off the display of the electronic device to the back or side of the wearable with interactive skin of this disclosure may provide ergonomic advantages and efficiencies in operation. For instance, an electronic device in the form factor of a smart phone may typically be held in one hand so that the other hand of the user may be free to interact with the smart phone by touch entry. Sometimes a user may hold the phone against the fingers of both hands and use the thumbs for touch interaction with the smart phone. In the wearable in the form factor of a casing with interactive skin of this disclosure, an interactive skin on the back side of the casing allows the fingers against which the back of the smart phone with wearable of this disclosure is placed to be used to touch the interactive skin on the back side of the casing for user interaction with the phone. In one illustrative embodiment, the sides of a smart phone are held firmly by the thumbs of the user and the fingers of the user may all be available for touch interaction with the interactive skin on the back side of the casing. This disclosure may free up the use of more fingers for touch interaction with the smart phone and may do so in a way that may be easier on the fingers and hands of the user so as to make it more ergonomically friendly.

The wearable 1210 in the form factor of a smart phone casing of this disclosure may be configured to provide the interactive skin 1220a, 1220b of this disclosure. Having interactive skin 1220a on the back side of wearable 1210 in the form factor of a smart phone casing 1220 may allow for a greater variety of user inputs to the smart phone. For instance, virtual control buttons on the interactive skin on the back side of the smart phone may provide control buttons additional to control buttons that are provided on the front side of the smart phone. This may increase the number of control buttons available to a user to provide input. In another illustrative embodiment, some or many or all of the virtual or real control buttons provided on the smart phone may be replaced by counterpart virtual or real control buttons provided on the back side of the smart phone in connection with the interactive skin.

For example, in one illustrative embodiment, virtual control button 1214a on the interactive skin on the back side of the smart phone may replace control button 1214 on the smart phone. Alternatively, virtual control button 1214a on the interactive skin on the back side of the smart phone may be a real control button, which may replace the control provided by control button 1214 on the smart phone.

In an illustrative embodiment where virtual control button 1214a or a real control button both on the interactive skin on the back side of the smart phone replace control button 1214 on the smart phone, the replacement may eliminate the need for control button 1214 on the smart phone. The absence of control button 1214 on the smart phone may free up the real estate occupied by the control button 1214 for other purposes such as extending display 1212 over that freed up real estate, thereby increasing the display area available to a user.

Figure 12E:
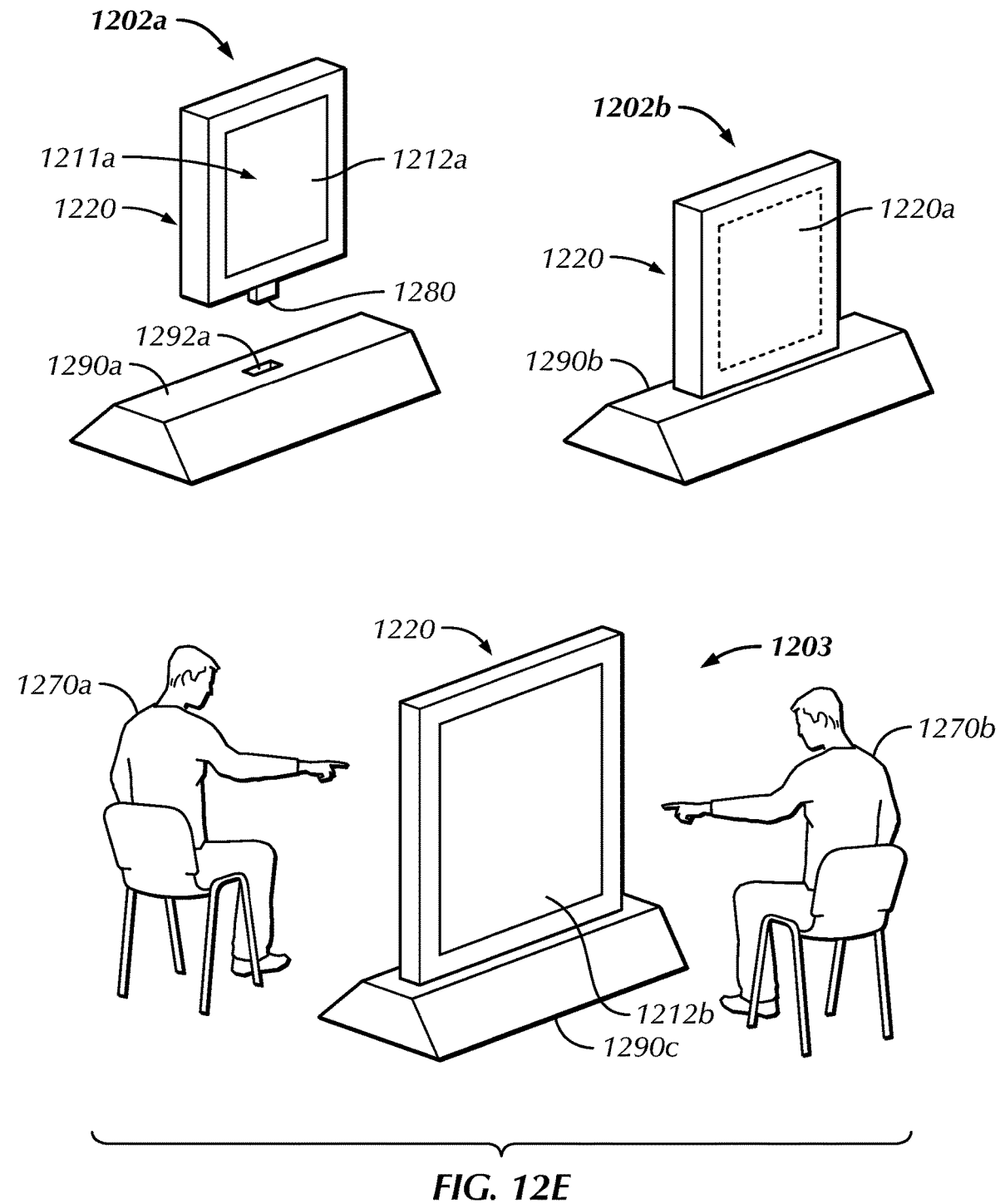

FIG. 12E shows aspects of an illustrative handbag for carrying an electronic device in this example illustratively a casing 1220 for an iPad 1211a and a casing 1220 for a computing device 1212b, the casing configured as or with an interactive skin in accordance with an embodiment of the present disclosure. The iPad 1211a is depicted inside wearable 1220 in the form factor of a casing in both a state in which the iPad inside wearable in the form factor of a casing is disassembled 1202a from a stand 1290a and in a state in which the iPad inside wearable in the form factor of a casing is assembled 1290b to stand 1290d. iPad inside wearable in the form factor of a casing may be assembled 1290b to stand 1290d by placement of a handle 1280 configured along and extending downwardly from a bottom side of the wearable 1220 in the form factor of a case into an opening 1292a located along a top side of the stand 1290a as depicted in the disassembled 1202a state of the pieces. In the assembled 1202b state of the pieces, the handle 1280 may be received and held by the opening 1292a so as to support the wearable in the form factor of a casing in an upright position such that a bottom side of the wearable in the form factor of a casing holding the iPad sits firmly against the top side of the stand 1290a. The handle 1280 may further include a power and data bus such as Lightning created by Apple configured to provide power and control from the computing electronics to the interactive skin of this disclosure according to this disclosure.

In the disassembled 1202a state, the wearable in the form factor of a casing is oriented to show the display 1212a of the smart phone. In the assembled 1202b state, the wearable in the form factor of a casing is oriented to show the back side of the wearable. In the illustrate embodiment depicted in the assembled 1202b state, the back side of the wearable includes an interactive skin 1220a of this disclosure which may operate in accordance with the teachings of this disclosure.

The wearable in the form factor of a casing 1220 for the computing device 1212b is depicted in an assembled 1203 state. The wearable here has a handle (not shown) like the handle 1280 in the assembled 1202a state of the iPad configured along and extending downwardly from a bottom side of the wearable 1220 in the form factor of a case. The stand 1290c has an opening (not shown) like the opening 1292a located along a top side of the stand 1290a as depicted in the disassembled 1202a state of the pieces including the iPad. In the assembled 1203 state of the pieces, the handle may be received and held by the opening so as to support the wearable in the form factor of a casing in an upright position such that a bottom side of the wearable in the form factor of a casing holding the computing device sits firmly against the top side of the stand 1290a.

In the assembled 1203 state, the wearable in the form factor of a casing is oriented to show the display 1212b of the computing device. The back side of the wearable includes an interactive skin of this disclosure and including an interactive skin like interactive 1220a depicted in the assembled state of the iPad to stand 1290b. As seen in the assembled state 1203 of the computing device to stand, the interactive skin on a back side of the casing holding the computing device may be used by one person 1270a and the display 1212b on the computing device may be used by another person 1270b in an illustrative example.

Assembled state 1202b depicts an iPad assemble and assembled state 1203 depicts a computing device assembly. In another embodiment, the assembly may be a smart phone or other computing device. The wearable for the smart phone or other computing device may be provided with a hand and a stand for holding the wearable in the form factor of a casing with smart phone in order to allow the smart phone or other computing device to be used by people on both sides of the smart phone or computing device.

In one illustrative embodiment both the display on the interactive skin and the display on the computing device may include a virtual control button 1214a (FIG. 12D) or real button or both in order that users on both sides of the computing device may have control buttons for controlling their display. Any number of real or virtual control buttons may be used on either display.

In another illustrative embodiment, the interactive skin extends along a side or top or bottom of the wearable in the form factor of the casing in order to enable touch control and display along these sides.

The interactive skin in the form factor of a case for an electronic device may overlay or be received within or form an integrated part of part of or substantially all or all of the wearable in the form factor of a case. The interactive skin in the form factor of a case for an electronic device always touch responsive inputs and outputs on both front and back and top and bottom and sides of the electronic device smart phone. This allows a user to provide touch input and receive output from the front and back and top and bottom and sides of the electronic device such as smart phone. It also allows more than one user to use the electronic device such as a smart phone at the same time as above.

In an illustrative embodiment, more than one interactive skin may be used with the wearable in the form factor of a casing. For instance, an interactive skin may extend along a back side of the casing and another interactive skin may extend along a side of the wearable in the form factor of a casing. In another illustrative example, an interactive skin along back side of the casing and an interactive skin along side of the wearable in the form factor of a casing may be one interactive skin. Sections of the interactive skin may be configured to be active and others inactive according to this disclosure such as by electrical deactivation of regions, masking, and running sections of the interactive skin into and within the wearable in the form factor of a casing.

In an illustrative embodiment, the display on the electronic device and the interactive skin of this disclosure may be active at the same time. For instance the display on the electronic device and a display on the interactive skin may be contemporaneously active. In this mode of operation, a user may touch interact with the electronic device such as smart phone on both the display of the electronic device and the touch interactive skin of this disclosure. In an illustrative embodiment, the display on the electronic device and the display rendered on the interactive skin of this disclosure may be active at different times. For instance, in one mode of operation the display of the electronic device such as smart phone may be active. In another mode of operation, the interactive skin of the electronic device such as smart phone may be active.

In an illustrative embodiment, such as assembled state 1203 of the wearable 1220 in the form factor of a casing for an electronic device depicted in FIG. 12E, the electronic device may be a computing device with large screen. The computing electronics may reside within or without the electronic device. For instance, the computing electronics may reside inside the housing for the display 1212b.

Alternatively, the computing electronics such as the processor may reside in the stand 1290C and the handle 1280 may further include a power and data bus such as Lightning created by Apple configured to provide power and control not only from the computing electronics in the stand to the interactive skin of this disclosure according to this disclosure but also to the display 1212b of the electronic device. The opening 1292a may include an electrical socket configured for adapting the power and data from the bus provided by handle 1280 to a bus in the stand for use by a processor in the stand to control the interactive skin of this disclosure and display 1212b. The electrical connector may interface to the previously explained control lines of the interactive skin to enable the processor in the stand to control the interactive skin as previously explained. The electrical connector may also interface to the control lines of circuitry controlling display 1212b to enable the processor in the stand to control the interactive skin. The handle 1280 may be received and held by the opening 1292a so as to support the wearable in the form factor of a casing in an upright position such that a bottom side of the wearable in the form factor of a casing holding the electronic device sits firmly against the top side of the stand 1290a.

In an illustrative embodiment, such as assembled state 1203 of the wearable 1220 in the form factor of a casing for an electronic device depicted in FIG. 12E, the electronic device may be a computing device with large screen with or without the computing electronics as previously explained.

Where the wearable in the form factor of a casing is fitted to a display screen such as a monitor for connection to computing electronics as previously explained in the illustrative example or in other examples in which the display screen may be activated with computing electronics, the electronic device received by the wearable may be a device with any electronic components whether or not it includes the computing electronics. In an illustrative embodiment, such device with wearable of this disclosure may be used in a school, such as a classroom. The device with wearable of this disclosure may be placed on a desk with chairs on both sides of the device with wearable. Students on both sides of the device with wearable of this disclosure may interact with the device with wearable of this disclosure. For instance, one student may interact with the display provided by the device with wearable of this disclosure. Another student may interact with the interactive skin on the back side of the display with wearable of this disclosure.

In an illustrative embodiment, such device with wearable of this disclosure may be used at a kiosk at a trade show. A booth operator may interact with the interactive skin on the back side of the wearable while a visitor may interact with the display of the electronic device held by the wearable with interactive skin of this disclosure. In an illustrative embodiment, such device with wearable of this disclosure may be used at an office, for example a cubicle. An employee may interact with the interactive skin on the back side of the wearable while another employee may interact with the display of the electronic device held by the wearable with interactive skin of this disclosure. In another illustrative embodiment, the device with wearable of this disclosure may be located in an airplane terminal, a mall, or any public or private place. The display of the electronic device may be accessed by one person while the interactive skin of this disclosure on a wearable containing the electronic device may be accessed by another person. As previously described, the interactions on the display of the electronic device and the interactive skin, such as a display on the interactive skin, may be contemporaneous, or not depending upon the processor and software design used with the electronic device and wearable with interactive skin of this disclosure.

Figure 12F:
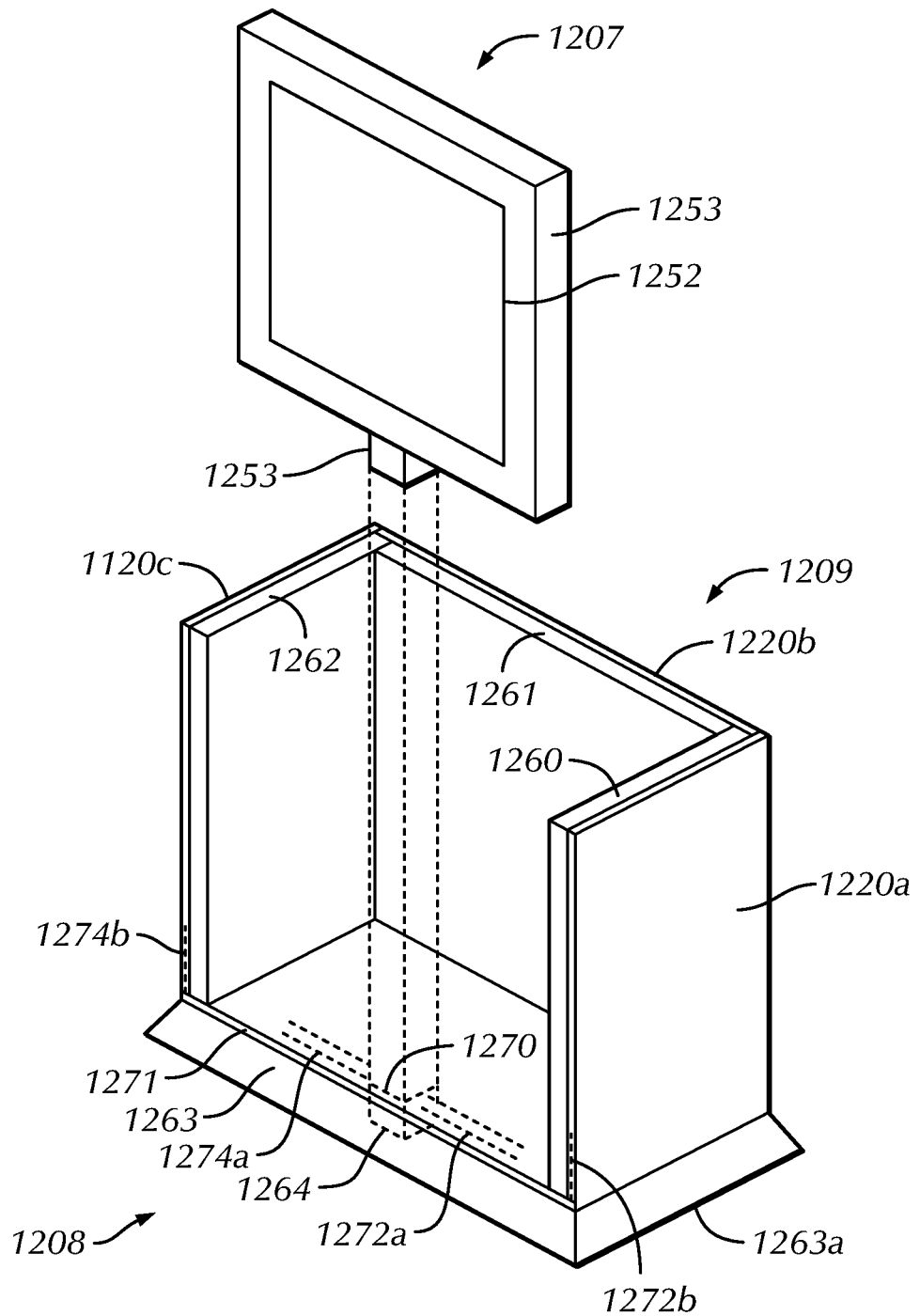

FIG. 12F depicts an electronic device 1207 having a housing 1253 and a display 1252 and a handle 1253 received by an opening 1264 in a stand 1208 including a front section 1263 and side and back sections (side section 1263a shown), the handle 1253 further may include a power and bus connection such as Lightning created by Apple configured to provide power and control interactive skin of this disclosure according to this disclosure as explained below. Stand 1208 includes panels 1260, 1261, and 1262 extend upwardly from the stand to form three surfaces. Panels 1260, 1261 and 1262 may be provided with an interactive skin 1220a, 1220b, and 1220c of this disclosure. A layer 1271 may overlay a top surface of front section 1263 of stand 1208. The layer 1271 may be illustratively formed of material structurally strong enough to support electronic device 1207 when seated on top of the layer 1271.

Layer 1271 may include conductive traces 1272a, 1272b that may connect with conductive traces 1272b, 1724b which may connect with conductive traces in interactive skin 1220b to control interactive skins 1220a, 1220b, 1220c. The number of conductive traces may depend upon whether one or more interactive skins are used. For instance if one interactive skin is used, a single set of traces may be used to connect with corresponding conductive traces in the interactive skin. If more than one interactive skin is used, a set of conductive traces may be configured to connect with conductive traces in each interactive skin.

Conductive traces 1272a, 1272b electrically connect with the power and control bus configured on handle 1253 when the electronic device 1207 is assembled to the stand 1208. When assembled the electronic device may control the interactive skins 1220a, 1220b, 1220c as previous described. In this illustrative example, the assembly increases the interactive display area of the electronic device available to a user by the three interactive surfaces 1220a, 122b, 1220c provided by the interactive skin of this disclosure. In this illustrative embodiment, a single electronic device may be interacted with by illustratively four people, one on each side for the four display assembly made possible by the teachings of this disclosure. The number of surfaces configured with interactive skin of this disclosure is a matter of design choice. For instance, the stand may have four or five or more panels to form a five, six, or more sided display assembly. This may allow more people to interact with the electronic device contemporaneously or not. In another embodiment, the one or more curved panels may be used to introduce one or more curved surfaces into the interactive surface. In one illustrative embodiment, the stand forms an entirely curved surface.

The interactive skin of this disclosure increases the surface area of an electronic device responsive to interaction with a user such as touch input and the other input and out function described herein. The increased surface area responsive to interaction enables a user more input and or output or both interactions with the electronic device and enables more than one user to use the same electronic device because there is more interactive surface of the electronic device that is accessible for input and out functions.

As explained herein, the wearable with interactive skin of this disclosure may have portions thereof provided by the wearable. Alternatively, the interactive skin may form the wearable itself.

Figure 13:
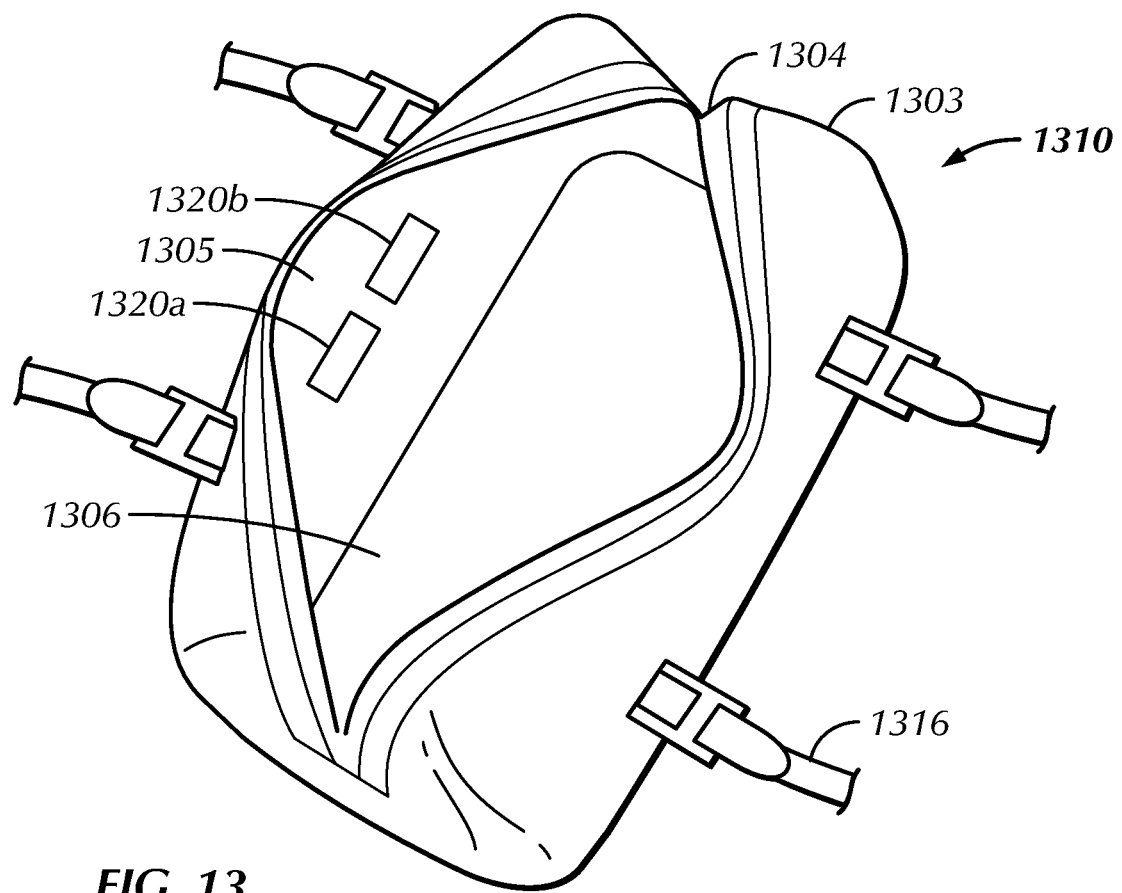
FIG. 13 depicts some illustrative uses of interactive skin in detecting a condition of a wearable accordance with this disclosure.

FIG. 13 depicts some illustrative uses of interactive skin in detecting a condition of a wearable accordance with this disclosure. FIG. 13 depicts an interactive skin 1320a on an inside portion 1305 of a wearable in the form factor of a handbag 1310 and an interactive skin 1320b also along the inside portion 1305. As explained in this disclosure interactive skin may overlay or be received within or form an integrated part of part of or substantially all or all of the wearable 1210 in the form factor of a handbag.

Each of interactive skin 1220a and 1220b is configured for detecting a condition of the wearable in the form factor of a handbag. The technology adapted to the interactive skin for detecting the condition may be a sensor. For example, one or more interactive skin may be configured with a sensor. For example, interactive skin 1320a may be configured with a motion detector sensor which detects motion. A user can interact with the interactive skin to activate or deactivate the motion detector sensor. For instance, the interactive skin may include a touch sensitive on-off switch configured to put the sensor in an active or inactive state depending upon switch setting. A user may activate the motion detector sensor when a handbag is put down such as at a table of a restaurant. If the handbag is taken the motion detector sensor is triggered. An audio alert provided by interactive skin as explained in this disclosure may alert the user on the occurrence of that condition.

In another example, the previously described handbag may carry a purse adapted with an interactive skin configured with a motion detect sensor. The motion detector of the purse may be configured to detect forceful motion such as the motion of a robber quickly removing a purse from a handbag. In one example, the motion detector sensor of the handbag is inactive and the motion sensor of the purse is active and triggerable upon detection of the forceful motion. In another example, both the handbag and purse are configured with a motion detector configured to detect forceful motion so that forceful movement of either handbag or purse will trigger the alert.

As another example, interactive skin 1320b may be configured with a temperature sensor configured to generate a change in state upon detection of a predetermined temperature. For example, if the temperature rises above a predetermined temperature, the interactive skin may generate an alert, thereby indicating to the user that there is an overheating condition in the handbag. This may be important in situations where the contents of the handbag are heat sensitive, such as medication, make-up, food and so on. The alert may be an audible alert or cause the color of the interactive skin to change. Illustratively, the change may occur by display of a different color by the interactive skin on occurrence of such condition. In an alternative example the interactive skin may be provided with a layer of temperature sensitive material that is configured to change color on occurrence of the condition.

The condition detected by the sensor used in connection with the interactive skin of this disclosure may be selected from the group consisting of temperature, pressure, current, voltage, incorrect electrical connection, etc. The response of the interactive skin to a condition detected by the sensor may be selected from the group consisting of audible alert, visual alert, or combination thereof. Responsive to a detected condition, the interactive skin of this disclosure may provide an audible alert or present a display indicating the detected condition.

The interactive skin may be configured to be touch sensitive as previously described to allow user to interact with the interactive skin. For instance, on touch the interactive skin may provide the current condition of the wearable with which the interactive skin is associated, such as current temperature reading by sensor. Further user interaction may cause the interactive display to display historical information on the wearable or provide other information. The user may interact with the interactive display in accordance with the teachings of this disclosure to learn more about the condition of the wearable with which the interactive skin is associated or to instruct the interactive skin to take some action such as change mode operation, change configuration, reset configurations, Responsive to the detected condition, the interactive skin may communicate the condition to an electronic component and thereby provides a notification service. In one example, the interactive skin may communicate the condition to a smart phone. The interactive skin may communicate information about the detected condition such as the existence of the condition, severity of condition, time remaining before failure, remedial steps that may be taken, and so on.

While FIG. 13 depicts the interactive skin of this disclosure applied to a wearable in the form factor of a handbag, the interactive skin may be applied to any wearable. For example, the footwear may be provided with an interactive skin instrumented to detect a condition of the footwear such as pressure on the sole of the footwear. In another embodiment, the user may interact with the interactive skin as disclosed herein. A wearable in the form factor of clothing may be provided with an interactive skin instrumented to detect a condition of the wearer of the clothing. For example, an interactive skin on a portion of a sports shirt may be instrumented to detect body temperature such as temperature during an activity like sports, hiking, dancing, and so on.

As previously explained, an interactive skin may be associated with one or more portions of a wearable to provide interaction between the portions and a user.

There is thus described a wearable including an interactive skin configured for accepting touch input from a user. The touch input from a user may render a display for user input and output functions.

The interactive skin may include a flexible display layer, a touch sensitive layer, and a transparent display cover layer. Thee flexible display layer may include image pixels. The touch sensitive layer may include at least one capacitive touch electrodes.

The touch sensitive layer may include a plurality of capacitive touch electrodes configured to detect the location of one or more touches or near touches on touch sensitive layer. The interactive skin may be configured for control by a control circuitry that selectively activates and inactivates the display pixels.

The user input and output functions may be configured for performing a function selected from the group consisting of: voice communication; data communication; sending emails; sending text messages; sending messages via applications; using GPS; enabling installation of programs; enabling running of programs; enabling calendars; enabling calculator; enabling an interface for data entry; enabling management of digital data and contacts; enabling displaying documents in at least one format; enabling word processing, spreadsheets, and document viewing; enabling internet access; enabling camera functionality; enabling capture of still images or video; enabling sending of still images or video; enabling making, editing, and storing videos and photos; enabling mp3 player; enabling running of mp3 player; enabling video game applications; enabling; enabling near field communication; audio information input; audio information output; text information input; text information output; image information input; image information output; video information input; video information output, or a combination thereof.

The interactive skin may include an active portion and an inactive portion, the active portion providing user input and output functions. The touch input from a user may create at least one virtual user interface element for controlling user input operations. The virtual user interface control may be a button.

The interactive skin may be configured to operate in at least one mode of operation. The interactive skin may be configured to also operate in at least a second mode of operation and wherein the user interface element is repurposed for controlling user input operations when the interactive skin is operating in the second mode of operation. The function of changing between the at least a first mode of operation and the at least a second operating mode of operation of the interactive skin may be selected from the group consisting of tapping, sliding, swiping, or other gesture motion of the user touch of the interactive skin.

The wearable may be selected from the group consisting of clothing, footwear, handbags, and accessories.

A wearable may include an interactive skin configured for detecting a condition of at least one wearable and generating an output function in response to the detected condition. The condition may be detected by a sensor. The sensor may generate an output upon a condition selected from the group consisting of temperature, pressure, current, voltage, incorrect electrical connection, incorrect mechanical connection, mechanical shock, mechanical stress, aging, corrosion, rusting, oxidizing, electrical circuit design. The response to detected condition may be selected from the group consisting of audible alert, visual alert, or combination thereof. The response to detected condition may be rendering of a display of the detected condition on the interactive skin. The output function may be a notification service.

The interactive skin may overlay the wearable. The interactive skin may be recessed into the wearable. The interactive skin may contour the shape of the wearable.

The foregoing is merely illustrative of the principles of this invention and various modifications can be made by those skilled in the art without departing from the scope and spirit of the invention.

Various other components may be included and called upon for providing for aspects of the teachings herein. For example, additional materials, combinations of materials, and/or omission of materials may be used to provide for added embodiments that are within the scope of the teachings herein.

While the invention has been described with reference to illustrative embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A casing for an object comprising:
   a cover overlying at least a portion of an object, the cover comprising display pixels, control lines, and an electrical interface,
   wherein the cover defines a cavity for receiving the object, the cavity including an insertion opening through which an object can fit;
   wherein the electrical interface is configured to be connectable to a processor, the processor controlling the display pixels over the control lines of the cover;
   wherein the cover connects with a support member, the support member supporting the object in an upright position; and
   wherein the processor is a processor in the support member.

2. The casing of claim 1, wherein the object is an electronic device.

3. The casing of claim 2, wherein the interface includes an electrical connector configured to connect to a port in the electronic device when the electronic device is fitted into the casing.

4. The casing of claim 1, wherein the object is a computing device.

5. The casing of claim 4, wherein the interface includes an electrical connector configured to connect to a port in the computing device when the computing device is fitted into the casing.

6. The casing of claim 1, wherein the object is a smart phone.

7. The casing of claim 6, wherein the interface includes an electrical connector configured to connect to a port in the smart phone when the smart phone is fitted into the casing.

8. The casing of claim 1, wherein the object is a panel.

9. The casing of claim 1, wherein the display pixels extend along a back side of the cover.

10. The casing of claim 1, wherein the display pixels form a display layer.

11. The casing of claim 10, further comprising a touch sensitive layer, the touch sensitive layer overlaying the display layer, the touch sensitive layer configured to detect the location of one or more touches or near touches on the touch sensitive layer;
    and wherein the touch input from a user renders a display on the display pixels for user input and output functions.

12. The casing of claim 1:
    wherein the cover includes a bottom surface;
    wherein the bottom surface is provided with an extending member, the extending member configured to fit into an opening of the stand;

wherein the opening of the stand supports the casing in an upright position when the extending member of the bottom surface of the cover is placed into the opening of the stand.

13. A display for an object comprising:

a flexible display layer configured to overlay at least one surface of an object, the flexible display layer comprising display pixels, control lines, and an electrical interface;

a stand configured to support an object overlain with the flexible display layer, the stand supporting the object in a position for upright viewing;

wherein the stand includes a processor;

wherein the electrical interface of the flexible display layer is configured to be connectable to the processor of the stand, the processor of the stand controlling the display pixels over the control lines of the flexible display layer; and wherein the display layer is in the form factor of a cover, the cover defining a cavity for receiving an object.

14. The casing of claim 13, further comprising a touch sensitive layer, the touch sensitive layer overlaying the display layer, the touch sensitive layer configured to detect the location of one or more touches or near touches on the touch sensitive layer;

and wherein the touch input from a user renders a display on the display pixels for user input and output functions.

15. The casing of claim 13, wherein the interface includes an electrical connector configured to connect to a port in the object when the object is fitted into the casing.

16. The casing of claim 13, wherein the object is an electronic device.

17. The casing of claim 13, wherein the object is a computing device.

18. The casing of claim 13, wherein the object is a smart phone.

19. The casing of claim 13, wherein the object is a panel.

20. The casing of claim 13, wherein the display layer extends along a back side of the cover.

* * * * *